US007787671B2

(12) United States Patent
De Leon et al.

(10) Patent No.: US 7,787,671 B2
(45) Date of Patent: Aug. 31, 2010

(54) METHOD, SYSTEM AND STORAGE MEDIUM WHICH INCLUDES INSTRUCTIONS FOR ANALYZING ANATOMICAL STRUCTURES

(75) Inventors: Mony J. De Leon, New York, NY (US); Lisa Mosconi, New York, NY (US); Wai-Hon Tsui, Staten Island, NY (US); Henry Rusinek, Great Neck, NY (US)

(73) Assignee: New York University, New York, NY (US)

( * ) Notice: Subject to any disclaimer, the term of this patent is extended or adjusted under 35 U.S.C. 154(b) by 925 days.

(21) Appl. No.: 11/184,218

(22) Filed: Jul. 18, 2005

(65) Prior Publication Data
US 2006/0025673 A1 Feb. 2, 2006

Related U.S. Application Data

(60) Provisional application No. 60/588,467, filed on Jul. 16, 2004, provisional application No. 60/691,715, filed on Jun. 16, 2005.

(51) Int. Cl.
*G06K 9/00* (2006.01)
(52) U.S. Cl. .................. 382/128; 382/181; 382/130; 382/131; 600/410; 378/4
(58) Field of Classification Search .......... 600/410; 382/128, 181, 294, 293, 131; 128/920, 923, 128/925; 702/19; 378/4
See application file for complete search history.

(56) References Cited

U.S. PATENT DOCUMENTS

| | | | |
|---|---|---|---|
| 5,961,457 A * | 10/1999 | Raylman et al. | 600/436 |
| 6,430,430 B1 * | 8/2002 | Gosche | 600/410 |
| 6,493,637 B1 * | 12/2002 | Steeg | 702/19 |
| 6,947,585 B1 * | 9/2005 | Jones | 382/131 |
| 6,980,683 B2 * | 12/2005 | Jones | 382/131 |
| 7,035,465 B2 * | 4/2006 | Comaniciu et al. | 382/190 |
| 7,046,833 B2 * | 5/2006 | Masumoto et al. | 382/131 |
| 7,054,473 B1 * | 5/2006 | Roehrig et al. | 382/128 |
| 7,209,579 B1 * | 4/2007 | Weisenberger et al. | 382/128 |
| 7,474,790 B2 * | 1/2009 | Dalal et al. | 382/225 |
| 2005/0240242 A1 * | 10/2005 | DiLorenzo | 607/45 |
| 2005/0282196 A1 * | 12/2005 | Costa | 435/6 |
| 2007/0081712 A1 * | 4/2007 | Huang et al. | 382/128 |
| 2008/0285828 A1 * | 11/2008 | Gagnon et al. | 382/131 |

OTHER PUBLICATIONS

Good et al, "A voxel Based Morphometric Study of Ageing in 465 Normal Adult Human Brains", 2001, pp. 21-36.*

(Continued)

*Primary Examiner*—Wes Tucker
*Assistant Examiner*—Nancy Bitar
(74) *Attorney, Agent, or Firm*—Dorsey & Whitney LLP

(57) ABSTRACT

A method, system and storage arrangement are provided for effectuating an evaluation and analysis of anatomical structures, and creating and/or modifying images associated therewith. In particular, at least two images associated with the anatomical structure can be normalized so as to produce normalized image. A normalized set of regions of interest can be obtained based on the normalized images. Each of the normalized set of regions of interest may be analyzed to provide analysis data. Further, the anatomical structure mask may be created and/or modified based on the analysis data. Another embodiment provides for rating and analyzing anatomical structures.

42 Claims, 12 Drawing Sheets

OTHER PUBLICATIONS

Gisepert et al ( Effect of the Normalization Template in Statistical ParametricMapping of PET Scans ), IEEE 2002, pp. 851-854.*

Catriona Good et al., "A Voxel-Based Morphometric Study of Ageing in 465 Normal Adult Human Brains", NeuroImage 14, 2001, pp. 21-36.

J.D. Gisper et al., "Effect of the Normalization Template in Statistical Parametric Mapping of Pet Scans", IEEE, 2002 pp. 851-854.

M. Desco et al., "Multimodality Image Qualification Using Talairach Grid", Medical Imaging 2001, pp. 1385-1392.

PCT International Search Report and Written Opinion for PCT/US2005/025495 dated Jul. 18, 2005.

"Reduced Hippocampal Metabolism in MCI and AD Automated FDG-PET image analysis" L. Mosconi et al., in AAN an Enterprises, Inc. pp. 1-8.

* cited by examiner

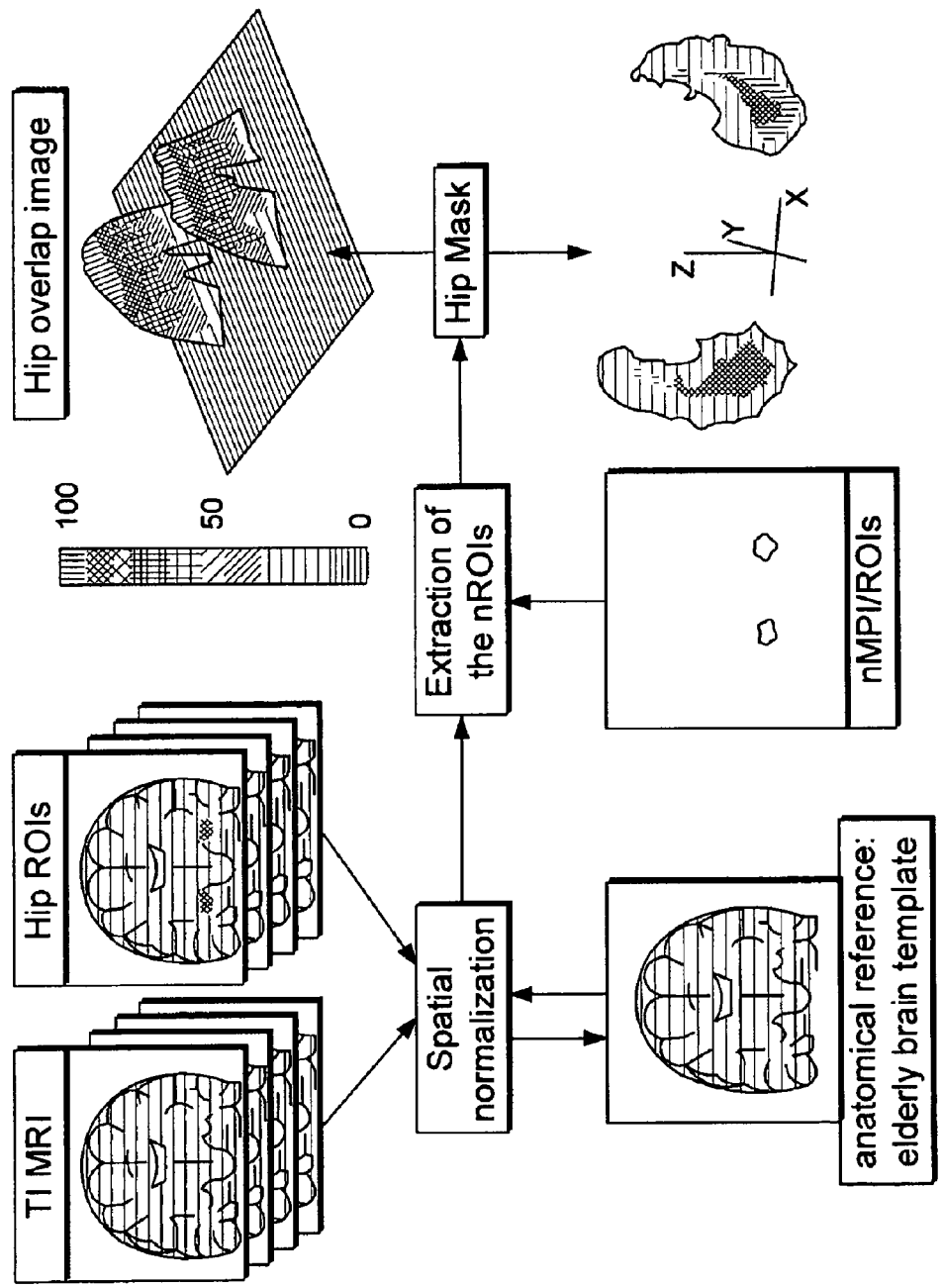
F I G. 9

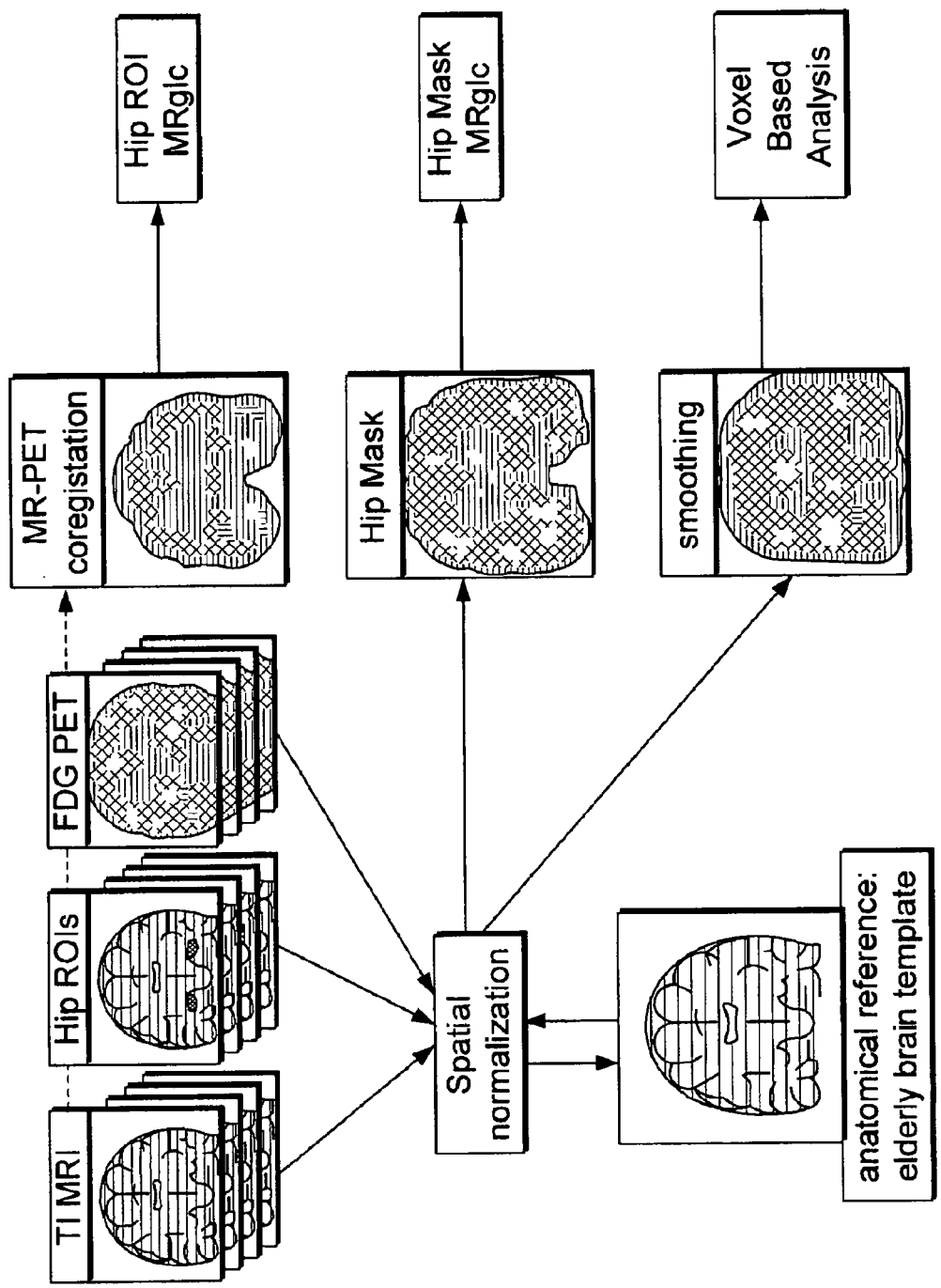
F I G. 10

METHOD, SYSTEM AND STORAGE MEDIUM WHICH INCLUDES INSTRUCTIONS FOR ANALYZING ANATOMICAL STRUCTURES

CROSS-REFERENCE TO RELATED APPLICATION(S)

The present application claims priority from U.S. Patent Application Ser. No. 60/588,4677 filed Jul. 16, 2004 and U.S. Patent Application Ser. No. 60/691,715 filed Jun. 16, 2005, the entire disclosures of which are incorporate herein by reference.

FIELD OF THE INVENTION

The present invention relates to a method, system and storage medium which includes instructions for analyzing anatomical structures (brain tissue and metabolism). More particularly, this analysis can include sampling and analysis of the hippocampus and medial temporal lobe, as well as an application of the sampling and analysis to assessing the presence of mild cognitive impairment and Alzheimer's disease, including in persons not yet displaying symptoms.

BACKGROUND INFORMATION

The following abbreviations will be used throughout the specification as follows:
"AD"—Alzheimer's disease
"MCI"—mild cognitive impairment
"GDS"—global deterioration scale
"MRglc"—glucose metabolism
"FDG"—18-fluoro-2-deoxyglucose 2-[$^{18}$F]fluoro-2-deoxy-D-glucose
"PET"—positron-emission tomography
"MR"—magnetic resonance
"ROI"—region of interest
"SPM"—statistical parametric mapping
"VBA"—voxel-based analysis
"HipMask"—hippocampus mask Certain publicly-available references are noted in this document, as appropriate. All of the references listed or referenced herein are incorporated herein in their entireties.

Both postmortem as well as in vivo Magnetic Resonance ("MR") imaging studies have identified the medial temporal lobe ("MTL"), and the hippocampus in particular, as one of the first sites of pathological involvement and early atrophy in Alzheimer's Disease ("AD"). The hippocampus is involved very early in the natural history of AD, and has been shown to be quite vulnerable to the pathology of the disease, namely Amyloid-beta deposition in extracellular plaques and vascular walls, accumulation of intracellular neurofibrillary tangles ("NFT"), synaptic reductions, neuronal loss, and volume loss (atrophy). Consequently, to facilitate the early diagnosis of AD, it may be useful to accurately assess the structural and functional integrity of the hippocampus.

Many MR studies describe reductions in the hippocampus volume relative to aged matched controls. The volume losses range between 25 and 50%, depending on disease severity. Furthermore, there is also clear evidence of hippocampal volume reductions among individuals with Mild Cognitive Impairment ("MCI"), a clinical group at high risk for AD. These hippocampal volume reductions have been found to be sufficiently reliable to identify the MCI patients who eventually convert to AD.

In contrast, the PET literature is not clear on the importance of the hippocampus assessment in AD. Significant reductions in hippocampal glucose metabolism (MRglc) in AD have been shown only by the few studies that have utilized MR for sampling the PET. These studies relied upon within-subject rigid body registration of the PET/MR scans and a traditional region-of-interest (ROI) method, as known to those skilled in the art and described herein. The ROI method requires MR scans to guide the PET sampling and time-consuming manual outlining of the hippocampus.

Another approach to image analysis is a surface projection method, based on simplifying three-dimensional data based on its radial projection on brain cortical surface. Unfortunately, current implementations typically preserve only the maximum metabolic activity along each projection ray, thus rendering hippocampal hypometabolism invisible to the human observer. Yet another approach can be the use of inter-subject image averaging, in which an individual three-dimensional dataset is morphed onto a PET template and each voxel is compared against a normative distribution of metabolic activity. Many PET studies utilize such fully automated analytic technique, enabling researchers to examine the whole brain at the single voxel level Several PET studies using this approach have been able to replicate previous ROI findings of hypometabolism within the temporo-parietal and posterior cingulate cortex in AD, along with the frontal cortex in advanced disease. However, few (if any) PET studies using voxel-based or surface projection methods report hippocampal metabolic abnormalities in MCI or AD as compared to controls.

Automated voxel-based methods typically rely on a series of pre-processing steps, such as spatial normalization and smoothing of scans, which attempt to put all the image volumes into the same spatial coordinate system and reduce intra-subject variability. Because of small size and variable position of the HIP within the brain, these procedures fail to identify hippocampal MRglc alterations in MCI and AD and that minimizing these sources of error could identify such alterations.

As yet another alternative, the distribution of FDG uptake, one tracer of brain glucose metabolism, may be evaluated by visual inspection of PET scans. Many studies have shown that reductions of brain glucose metabolism, as assessed with FDG-PET, are diagnostically useful for AD and possibly other neurodegenerative diseases. As with the prior discussion of PET studies, such studies rely on estimation of changes in cortical brain metabolism and have not reported data on the hippocampus.

Several methods can be used to estimate changes in brain metabolism. The most common one of these methods are visual qualitative ratings, MRI-guided ROI and automated voxel-based analysis techniques. As described above, ROI and voxel-based techniques are mainly used for research purposes in studies on selected groups of patients and controls, require intensive pre-processing labor, and rely on dedicated software. To be used in the routine clinical examination of dementia, a diagnostic tool has to be easy to use and operator-independent. The most commonly used technique to evaluate brain metabolism in the clinical practice is the visual inspection logic of FDG-PET scans. Conventionally, visual inspection of the PET in the AD diagnosis focused on the cortex, mainly parieto-temporal, posterior cingulate (PCC) and/or frontal regions. There is evidence that cortical PET ratings are sensitive discriminators of AD and useful in the differential diagnosis from other dementias. These results of cortical hypometabolism have been confirmed by ROI and VBA studies.

However, the usefulness of cortical hypometabolism in identifying patients with MCI is controversial. Some FDG- PET studies in MCI reported cortical metabolic reductions, while several others did not. On the other hand, studies using MRI based ROI sampling consistently show significant hypometabolism in the (MTL in MCI and AD. As such, the ROI FDG-PET data is consistent with post-mortem and in vivo structural MRI studies showing that the MTL an early site of pathological involvement and early volume loss (atrophy) in AD.

Similarly, current methods and apparatuses for anatomically validating MTL hypometabolism may be unreliable or imprecise, especially when a visual evaluation is employed. Generally, visual evaluations fall short of the "gold standard" or computerized ROI measurements of metabolism. Computerized ROI implementations, however, may be both time-consuming and relatively expensive when compared to visual evaluations, and thus may be less suitable for diagnostic purposes.

Additionally, prior FDG-PET studies show that the characteristic pattern of cortical hypometabolism observed in AD enables accurate AD identification in 90-100% of the cases. Moreover, there is evidence that a positive PET diagnosis for progressive neurodegenerative disorder predicts future cognitive deterioration with 84% accuracy, and significantly improves prediction of subsequent clinical course over the clinical working diagnosis. However, these studies compared AD patients to normal controls and did not evaluate the accuracy of PET ratings in the diagnosis of MCI or to normal subjects who may be at increased future risk for MCI or AD.

Similarly, single-photon emission computed tomography (SPECT) scans may be employed as relatively sensitive discriminators of AD, and have been useful in the differential diagnosis of AD from other dementias. Briefly, SPECT scans use measures of perfusion to estimate damage to the brain. However, like PET scans, SPECT scans have shown only a limited ability to examine a patient's hippocampus.

Accordingly, improved methods, systems and storage medium for sampling and analyzing brain tissue that overcome the shortcomings of the previous methods and systems are preferable.

SUMMARY OF THE INVENTION

Thus, the present invention provides exemplary embodiments of methods, systems and storage media which fulfill such needs.

In particular. a first embodiment of the method, system and storage medium of the present invention is provided which allows for accurate sampling of the hippocampus on PET using automated (or computerized) routines. This was done by assessing the extent of hippocampus volume overlap after spatial normalization of elderly brains, as done with VBA techniques. Based on high resolution MR and large normative sample, the embodiment generally establishes a probabilistic map of the hippocampus in the stereotactic space. The map may be translated to a probabilistic masking image that may be used in a reliable and automated procedure for sampling the hippocampus on a PET scan. This method was then tested for reliability against the ROIs and for accuracy in diagnosing MCI and AD. This may demonstrate that when anatomically correct sampling is utilized the voxel-based method is reliable enough for the hippocampus.

A second embodiment of the method, system and storage medium of the present invention may be provided for visually rating the presence of cortical and MTL hypometabolism using a newly developed qualitative 4-point visual rating scale that was created from the FDG-PET scans of NL, MCI, and AD patients. Ratings may be performed blindly with respect to clinical data. The MTL ratings may be compared with quantitative MRglc data extracted using ROI from the MRI-coregistered PET of all subjects, for validation purposes. Sensitivity, specificity and overall accuracy of the cortical and MTL ratings, as well as ROI MRglc may be evaluated and contrasted as diagnostic tools.

Visual rating of the MTL on MRI scans have shown a good comparability with MRI volume study. Accordingly, visual rating of FDG-PET scans may permit (a) developing a reliable and anatomically valid visual rating scale of MTL hypometabolism on FDG-PET, (b) determining the anatomical validity of the visual MTL rating by comparing the diagnostic capacity of the MTL rating with quantitative metabolic values derived from the gold-standard ROI sampling technique, and (c) comparing the diagnostic accuracy of the MTL rating to the cortical rating in terms of being able to separate clinical groups.

Generally, the second exemplary embodiment of the method, system and storage medium of the present invention is capable of providing a high intra and inter-rater reliability for both the cortical and MTL ratings. Across several comparisons among raters, Intra-Class Correlation Coefficients (ICCs) ranged from 0.90 to 0.96 with $p<0.001$. Conventional cortical rating generally significantly discriminates AD from NL (in some cases, achieving 100% accuracy) and AD from MCI (in some cases, achieving 88% accuracy) but fails to distinguish MCI from NL. This embodiment may distinguish MCI from NL via the MTL rating (achieving, for example, a 74% accuracy), which may improve the early diagnosis of AD at the MCI stage over traditional methods. The MTL ratings may yield a diagnostic accuracy equivalent to so-called "gold-standard" ROI MRglc measures.

Accordingly, an exemplary embodiment of a method, system and storage arrangement are provided for effectuating an evaluation and analysis of function (such as glucose utilization) in anatomical structures, and creating and/or modifying images associated therewith. In particular, at least two images (in some embodiments, a representative set of many diverse brain images) associated with the anatomical structure (such as the hippocampus) can be normalized so as to produce normalized image. A normalized set of regions of interest can be obtained based on the normalized images. Each of the normalized set of regions of interest may be analyzed to provide analysis data. Further, the anatomical structure mask may be created and/or modified based on the analysis data.

Further, the analysis is performed by determining a percentage of overlap region for each of the normalized set of regions of interest, and selectively iterating each of the normalized regions of interest through the first normalized set of regions of interest. In addition, it is possible to determine an optimal ratio of sensitivity to specificity for the normalized set of regions of interest, and modify the anatomical structure mask to account for the optimal ratio. A patient set can be selected, and the images associated with the anatomical structure may be generated. Each of the first set of images can correspond to a unique one of the patient set. At least two regions of interest can be determined, each of the regions of interest corresponding to a unique one of the at least two images and containing an image of the anatomical structure. Each of the normalized set of regions of interest may correspond to a unique one of the regions of interest.

In another exemplary embodiment of the present invention, the anatomical structure may be a brain. Each of the normalized set of regions of interest may include a hippocampus. Each of the normalized set of regions of interest may also include an amygdala. A template can be generated from each of the normalized images. The operation of obtaining a normalized set of regions of interest based on the normalized images may include. Each of the normalized images may be registered to the template to create a set of registered images. The normalized set of regions of interest may be extracted from each of the registered images. The anatomical structure mask may include a mask of an average anatomical structure. The mask of an average anatomical structure may be derived from the at least two images.

According to still another exemplary embodiment of the present invention, the images may be magnetic resonance images and/or positron-emission tomography images. At least a third image may be obtained. The third image may be registered to one of the first or second images. A region of interest corresponding to the third image may be obtained, and the anatomical structure mask can be applied to the region of interest corresponding to the third image. Further, the third image may be normalized to a template. The images may be a first image type, and the third image can be a second image type. The first image type may also be a magnetic resonance image, and the second image type can be a positron-emission topography scan.

In addition, an exemplary embodiment of model according to the present invention for an anatomical structure may be provided. For example, the model may include data associated with an averaged region of interest bounded within the anatomical structure. The averaged region of interest is associated with at least two images, each of the images including a corresponding region of interest. The averaged region of interest may be derived from the images, the images may be selectively iterated. An optimal ratio of sensitivity may be determined to specificity for the corresponding regions of interest. The aforementioned images may be, for example, MRI scans, PET scans, computed tomography (CT) scans, and/or SPECT scans. It should be understood that these image types are provided by way of example and not limitation; additional image types known to those skilled in the art may be used with the systems, methods, and apparatuses described herein.

BRIEF DESCRIPTION OF THE DRAWINGS

For a more complete understanding of the present invention and its advantages, reference is now made to the following description, taken in conjunction with the accompanying drawings, in which:

FIG. 9 is a graphical display of the generation of the mask in accordance with the exemplary embodiment of the present invention; and FIG. 10 is a graphical display of the application of the mask and the resulting image, as well as alternative analytical techniques commonly employed with PET scans to determine hippocampus locations.

DETAILED DESCRIPTION

Generally, one exemplary embodiment of the present invention provides a system for accurately bounding hippocampal tissue within a PET or MRI scan, referred to colloquially as a "HipMask." Another exemplary embodiment of the present invention is a method for generating the HipMask. The HipMask, in broad terms, can be described as an overlay or mask created from an averaged and normalized set of scans. Generally, the HipMask permits sampling hippocampal tissue with a high degree of accuracy and precision, as well as facilitating measurement of changes (such as reductions) in brain metabolism in the volume sampled, for example, in the hippocampus.

A second exemplary embodiment of the present invention takes provides a method for visually rating the presence of cortical and MTL hypometabolism using a newly developed qualitative 4-point visual rating scale.

It should be understood that the present invention, including methods of construction, application, systems, storage medium and apparatus, may be useful in analyzing other brain regions beyond the hippocampus. For example, other portions of the MTL, or other brain areas such as the cortical regions, may be similarly isolated and analyzed using the apparatuses and methods disclosed herein.

1. First Exemplary Embodiment

Hippocampal Mask (HipMask)

Figure 1A:
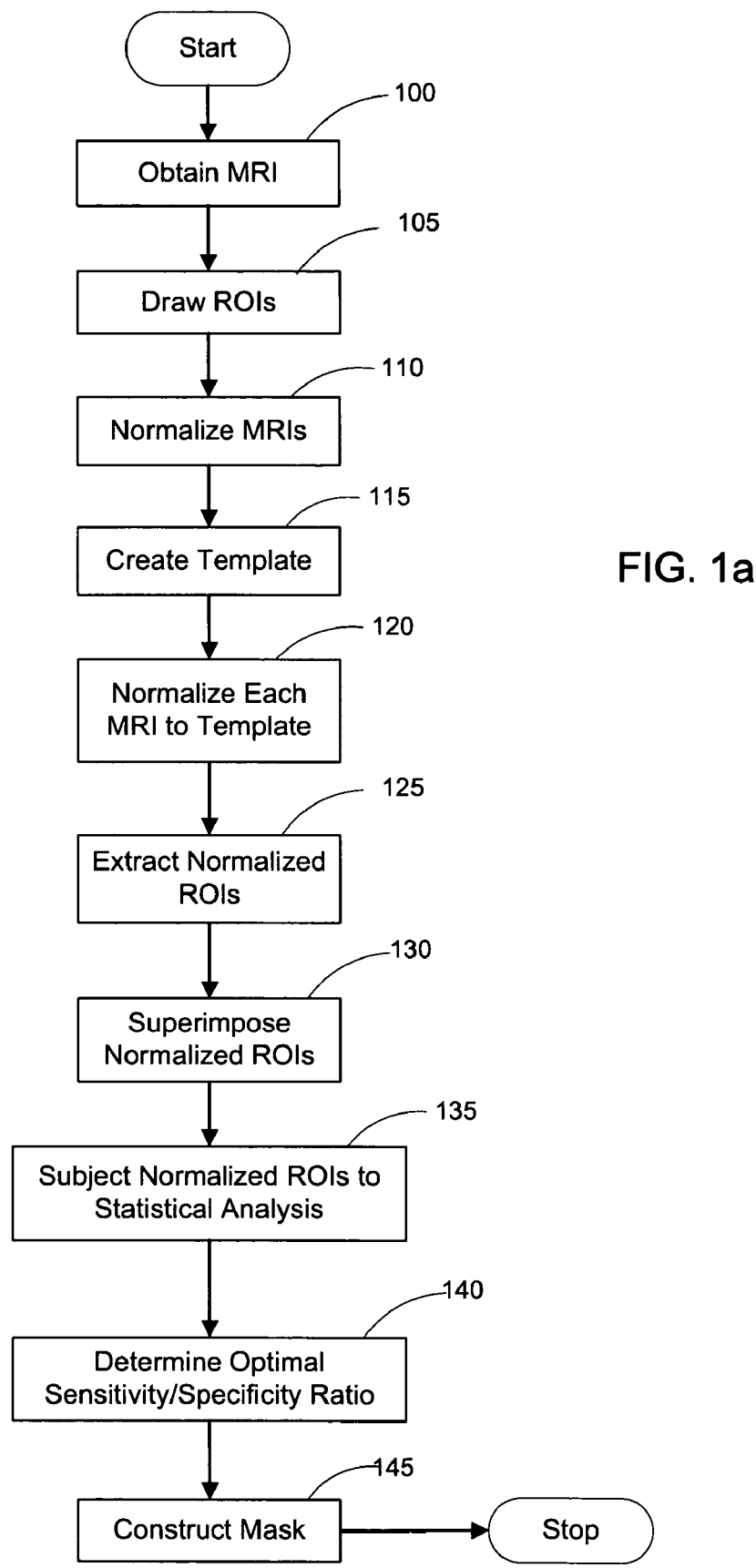
FIG. 1a is an exemplary embodiment of a method for creating a mask of an anatomical structure in accordance with the present invention.

FIG. 1a depicts a flow diagram of an exemplary embodiment of a method for constructing a HipMask. FIG. 9 depicts an exemplary display of such exemplary method, in which images for the scanned cross-sectional view of a brain is displayed as MRI 10, Hippocampal ROI 20, and HipMask 30. Indeed, the HipMask 30 image can be constructed by utilizing the exemplary method illustrated in the flowchart of FIG. 1. Referencing the exemplary method shown in FIG. 1, after a group of patients of sufficient size are assembled (as discussed below), magnetic resonance images (MRIs) are taken of each patient's brain in operation 100 to create a set of MR scans or MRIs. (The terms "MR scan" and "MRI" are used interchangeably herein.) The MR scanning procedure may employ any scanning parameters that provide a sufficiently precise brain image. Briefly, one embodiment of the present invention may employ MR scans 10 generated by a-1.5 T General Electric Signa imager. Exemplary MR scans known to be of sufficient precision and clarity include those generated by means of a T1-weighted fast-gradient-echo with repetition time (TR)=35 ms, echo time (TE)=9 ms, and flip angle=60° reconstructed into 124 contiguous slices. MR scans 10 may be acquired, for example, as coronal 1.3-mm-thick images obtained perpendicular to the long axis of the hippocampus (for example, having a field of view (FOV) equal to 18 cm, a number of excitations (NEX) equal to 1, and a 256×128 matrix). Alternative embodiments may employ somewhat different parameters in the MR scanning process.

Next, in operation 105, the regions of interest (ROIs) 20 including the hippocampus can be defined for each MRI 10. The ROIs 20 may be determined in any manner known to those skilled in the art.

In one exemplary embodiment of the present invention, the ROIs 20 may be obtained by transferring the MR scans 10 to a suitable computing system, such as a Sun Sparc workstation manufactured by Sun Microsystems of Mountain View, Calif. The hippocampus ROIs 20 may be manually drawn on coronal MR images using, for example, a Multimodal Image Data Analysis System package (MIDAS, 1.6 version). Alternative embodiments may employ different image data analysis systems, or may permit automatic drawing of the ROIs.

Generally, the hippocampus ROI 20 measurements may be performed according to previously described techniques and anatomical landmarks. In one exemplary embodiment, drawings may be generated along the whole rostrocaudal extent of the hippocampus (i.e. along the head, body and tail of the hippocampus) and the subiculum on both hemispheres on each slice. The lateral border of this region is typically the temporal horn of the lateral ventricle. The inferior border is generally the white matter (WM) of the parahippocampal gyrus (PHG). The medial border may be the line drawn perpendicularly to the brain surface from the dorsal curve of the PHG. On most rostral sections, the subiculum or the subiculum and the hippocampus may be distinguished from the amygdaloid body by fibers of WM interposed between these regions. In the anterior sections, at the level of the uncus, the subiculum or the hippocampus may be separated from the dorsally located hippocampal-amygdaloid transitional area by drawing a horizontal line just above the curve of the most medial aspect of the uncus.

Next, in operation 110, the various ROIs 20 may be spatially normalized. Statistical Parametric Mapping (SPM) may be used for the automated normalization of the MR scans 10 to take advantage of its demonstrated alignment accuracy (more detail on SPM may be found at the website of the Wellcome Department of Cognitive Neurology, London: http//:www.fil.ion.ucl.ac.uk/spm). For each MR scan 10, a duplicate image may be generated with the hippocampus ROIs intensity encoded as follows: all voxels in the hippocampus ROIs 20 may be set to a uniform value of 5000, while all background voxels outside the ROIs may be set below 5000. Typically, this can yield an ROI value approximately 75% brighter than the maximum signal intensity in a standard MR image of the MTL of the brain.

MR scan images 10 with and without embedded ROIs 20 may be converted into a variety of computer-readable data formats for processing and analysis. In exemplary one embodiment, the MRIs may be converted into the well-known "Analyze" format and processed using Matlab 6.0 and SPM'99 following standard procedures. SPM'99 is one example of a voxel-based analysis technique.

The MR scans 10 may be spatially normalized to a common space, such as the Montreal Neurological Institute (MNI) space, which can be derived from 152 normal subjects and approximates the Talairach space. Other exemplary embodiments may be implemented to normalize the scans to a different space. This spatial normalization may include both linear and nonlinear transformations.

After each of the MR scans 10 is normalized in operation 110, the normalized MRIs may be used to create a template in operation 115. The anatomical brain template is created from the entire set of MR scans 10 (i.e., the MR scans of all patients) in order to provide a template appropriate to the population sample. The template is effectively the average of all normalized MR scans. To create the template, each MRI 10 is smoothed. Accordingly to one exemplary embodiment, the MRIs can be smoothed with an 8-mm full-width at half-maximum (FWHM) isotropic Gaussian kernel. After the smoothing operation, the set of MRIs can be averaged to form the template image 40, which may be referred to herein as a "NYU-MR" template.

In operation 120, the base MR scans 10 (in native space and without embedded ROIs 20) are transformed to a common stereotactic space by registering each scan to a common template 40 using the residual sum of squared differences as the matching criterion. In one exemplary embodiment, the scans may be registered to the NYU-MR template. Other exemplary embodiments may be used for registering to different common templates. To spatially normalize the MRIs 10 to the template 40, the exemplary embodiment of the method according to the present invention estimates an optimum 12-parameter affine transformation to match images, followed by a linear combination of 7×8×7 smooth spatial basis functions. A masking procedure may be employed to weight the normalization to brain rather than non-brain tissue. The spatially normalized MR images 10 may be resliced using SINC interpolation and represented on a 105×126×91 matrix with a final voxel size of 1.5×1.5×1.5 mm (origin set at 53 76 34 mm). Other methods for spatially normalizing the set of MRIs 10 to the template 40 are known to those skilled in the art. Thus, it should be understood that the exact parameters disclosed herein for normalizing the MRIs 10 to the template are exemplary, rather than limiting.

After each MR scan 10 is normalized to the template 40, the same parameters can be typically applied to normalize the corresponding MR scan with the embedded ROIs 20, using Nearest-Neighbor interpolation. Thus, all MR scans may be normalized, both those with and without embedded ROIs. The normalized ROIs 20 may be extracted from the MRIs 10 in operation 125, and superimposed on one another in operation 130.

Statistical analysis may be performed on the set of superimposed, normalized ROIs 20 in operation 135. A brief discussion of the extent of hippocampus volume overlap after spatial normalization may prove useful in understanding the statistical analysis. Based on the spatially normalized hippocampus ROIs 20 of the entire sample, a probabilistic map of the hippocampus may be established in the stereotactic space. Normalized hippocampus ROIs (nROIs) 50 from the subjects may be superimposed slice by slice. A count image may be created with the number of subjects overlapping for each voxel ranging from 0% (no overlap between any subjects) to 100% (all subjects overlapping).

As a further example of the statistical analysis undertaken in operation 135, the dimension of the intersection region between the ROIs 20 may be dependent on the sample size and is likely to diminish with increasing numbers of subjects. This occurs because of the variability in the position and anatomy of the hippocampus. In order to develop a hippocampus sample independent of the sample size that could be extended to the general population, masks for the hippocampus may be defined as that hippocampal anatomy shared by a given percentage of the patients of whom MRIs 10 were taken (i.e. 100%, 99%, 98% overlap, etc). The sampling mask, or HipMask 30, may be created from the percentage-of-overlap region satisfying the following criteria, listed in descending order of importance: (1) overlap≧80% (2) dimension≧2 times the FWHM of a typical PET scanner (i.e. 45 voxels for a FWHM of 6.7 mm); (3) the frequency of the number of voxels within the region follows a normal distribution; and (4) highest positive likelihood ratio (PLR).

For each percentage-of-overlap region, bootstrapping with replacement and appropriate follow-up Shapiro-Wilk tests (P<0.05) may be used to test the normality of the distributions of voxels frequency at the different percentage levels (100%, 99%, 98%, etc.). "Bootstrapping" and Shapiro-Wilk tests are known to those skilled in the art, and accordingly are not discussed in greater detail here.

The Levene's test for equal variances may be used to identify the distribution with the smallest variance (P<0.05) may also be part of the HipMask 30 creation process.

In operation 140, an optimal PLR can be determined. The PLR may be defined as the ratio between sensitivity and (1−specificity). In order to reduce the potential for false positives, a conservative approach may be used. The sampling mask may be created based on information associated with the percentage-of-overlap region with the highest PLR, i.e. the sample that optimizes the ratio between sensitivity and specificity, where "sensitivity" is defined as the hippocampus volume correctly included in the sampling region (true positives) divided by the total hippocampus volume (false negatives) and (1−specificity) is defined as the volume of non-hippocampus incorrectly included in the mask (i.e., false positives) divided by the total non-hippocampus volume (i.e. the total intracranial volume−hippocampus volume, or true negatives).

Given the optimal PLR of operation 140, the HipMask 30 may be generated in operation 145. The HipMask 30 is a binary masking image including all the voxels in the selected percentage-of-overlap region across the set of MR scans 10.

Generally, the HipMask 30 provides a high degree of sensitivity and specificity. In other words, the HipMask is precise when applied to a normalized MRI 10 in order to locate and sample the hippocampus. This is the case even where the HipMask 30 is applied to normalized MRIs outside the set of MR scans 10 constructed in operation 100 (i.e., when the HipMask is applied to a normalized MRI not used to construct the HipMask), because the bootstrapping and other statistical analyses discussed herein generalize the HipMask sufficiently to apply to nearly any normalized MR scan of the brain. The HipMask 30 effectively models an "average" or generic ROI 20 defining the hippocampus, and thus may be effectively used in a variety of clinical, diagnostic, and testing roles.

The HipMask 30 can be associated with a probabilistic mask of the hippocampus, with the center of the mask corresponding to the geometric center (centroid) of the template hippocampus. For example, according to certain experiments, the HipMask 30 may be approximately 96% precise. The range of precision may be 82%-100%. For example, when the HipMask 30 was placed atop a variety of normalized MRIs 10, 96% of the brain tissue included within the HipMask was hippocampal tissue and only 4% was not. In the most atrophic AD case, still 82% of the content of the HipMask was true hippocampal tissue The procedure described above with reference to FIG. 1 may be employed to construct masks of other areas of the brain, such as the amygdala. Constructing a different mask requires changing the defined ROI 20, but otherwise is substantially similar to the method of FIG. 1a.

Additionally, it should be understood that multiple HipMasks 30 (or masks of other portions of the brain or another organ) may be created using the exemplary method described above with reference to FIG. 1a. It is possible to, for example, select a first set of patients to create a first set of MRIs 10 and a second set of patients to create a second set of MRIs. The first set of patients may all have healthy, non-shrunken hippocampi, while the second set of patients may all suffer from degeneration of the hippocampus. In this manner, a "healthy" and "unhealthy" HipMask 30 may be created. The healthy HipMask may enjoy a higher precision when matched with normalized MRIs of other, healthy hippocampal structures, while the unhealthy HipMask may have greater precisions when matched with normalized MRIs of unhealthy hippocampi.

FIG. 9 generally depicts a graphical illustration of the construction of a HipMask 30, analogous generated by the method associated with FIG. 1a.

2. Subjects and Testing of the First Exemplary Embodiment

As discussed above, a set of subjects is typically selected to undergo MR scans in operation 100. In one test of the HipMask 30 procedure, subjects were drawn from the New York University ("NYU") School of Medicine Alzheimer's Disease Core Center. Informed consent was obtained from all subjects at NYU and for AD patients also from a caregiver. Subjects received an extensive screening and diagnostic battery that included medical, neurological, psychiatric, neuropsychological, and MR examinations.

Subjects were excluded if they had evidence of conditions affecting brain structure or function (e.g., stroke, diabetes, head trauma, depression) or use of cognitively active medications. (McKhann et al., 1984)

Eighty-four subjects were included in this study. All were older than 50 years of age and had a minimum of 12 years education. The elderly NL selected for study had Mini Mental State Examination (MMSE) scores≧28 and Global Deterioration Scale (GDS) scores of 1 or 2. The MCI patients selected had MMSE scores>24 and GDS scores=3. The mild to moderately severe AD patients received GDS scores of 4 or 5. The diagnosis of probable AD was consistent with the guidelines of the National Institute of Neurological and Communicative Disorders and Stroke (NINCDS)-Alzheimer's Disease and Related Disorders Association (McKhann et al 1984) and the *Diagnostic and Statistical Manual of Mental Disorders IV* (DSM-IV, APA 1994) criteria.

This project used two study cohorts (see Table 1). In the development of the HipMask 30 in Study 1 a "training" cohort of NL (n=20), MCI (n=16) and AD (n=12), was used for a total of 48 subjects. In the implementation of the HipMask 30 in Study 2 the 'testing' cohort was comprised of NL (n=11), MCI (n=13) and AD (n=12), for a total of 36 subjects (Table 1).

TABLE 1

Subjects' characteristics.

|  | NL | MCI | AD |
| --- | --- | --- | --- |
| Study 1 - Training cohort | | | |
| N | 20 | 16 | 12 |
| Age (yrs) | 68 (9) | 66 (10) | 68 (8) |
| range | 53-83 | 52-81 | 55-79 |
| % Females | 50 | 50 | 64 |
| MMSE | 29 (2) | 29 (2) | 23 (3)*† |
| range | 28-30 | 24-30 | 18-27 |
| Education (yrs) | 16 (3) | 16 (2) | 14 (2) |

TABLE 1-continued

Subjects' characteristics.

| | NL | MCI | AD |
|---|---|---|---|
| Pes-hippo-campus volume (cc) | 1.32 (.14) | 1.10 (.12)* | 1.14 (.10)* |
| Supratentorial volume¶ (cc) | 85.7 (8.0) | 86.5 (8.1) | 84.8 (7.3) |
| Study 2 - Testing cohort | | | |
| N | 11 | 13 | 12 |
| Age (yrs) | 76 (5) | 75 (6) | 76 (7) |
| range | 68-87 | 63-82 | 63-87 |
| % Females | 42 | 40 | 50 |
| MMSE | 29 (1) | 29 (2) | 20 (7)*† |
| range | 28-30 | 24-30 | 18-26 |
| Education (yrs) | 16 (3) | 16 (3) | 15 (3) |
| Hippocampus ROI MRglc | 25.6 (4.2) | 22.3 (3.2)§ | 19.6 (5.3)* |
| Hippocampus ROI MRglc° | 27.9 (4.1) | 24.7 (3.2)§ | 21.9 (4.5)‡ |
| HipMask MRglc | 27.4 (4.8) | 24.9 (4.4)‡ | 20.7 (5.2)* |
| Pons MRglc | 22.8 (2.9) | 22.0 (3.8) | 22.4 (2.9) |

Values are means (SD).
Abbreviations. Mini-Mental Status Examination (MMSE); metabolic rate for glucose (MRglc, μmol/100 gr/min, unadjusted values).
Symbols.
¶Intradural supratentorial compartment volume;
°atrophy corrected MRglc.
*Significantly different from NL, p < .001.
†Significantly different from MCI, p < .001.
‡Significantly different from NL, p < .005.
§Significantly different from NL, p < .05.

Figure 3:
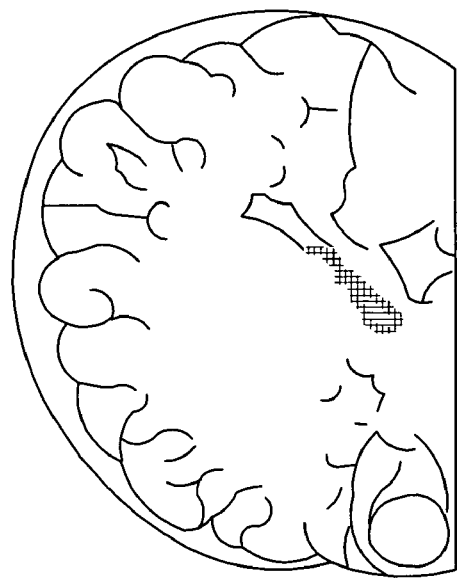
FIGS. 3a-3c are illustrations of normalization results for the mask.
Figure 3:
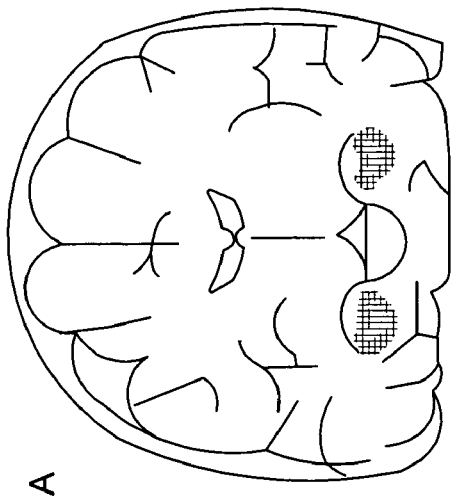
Figure 3:
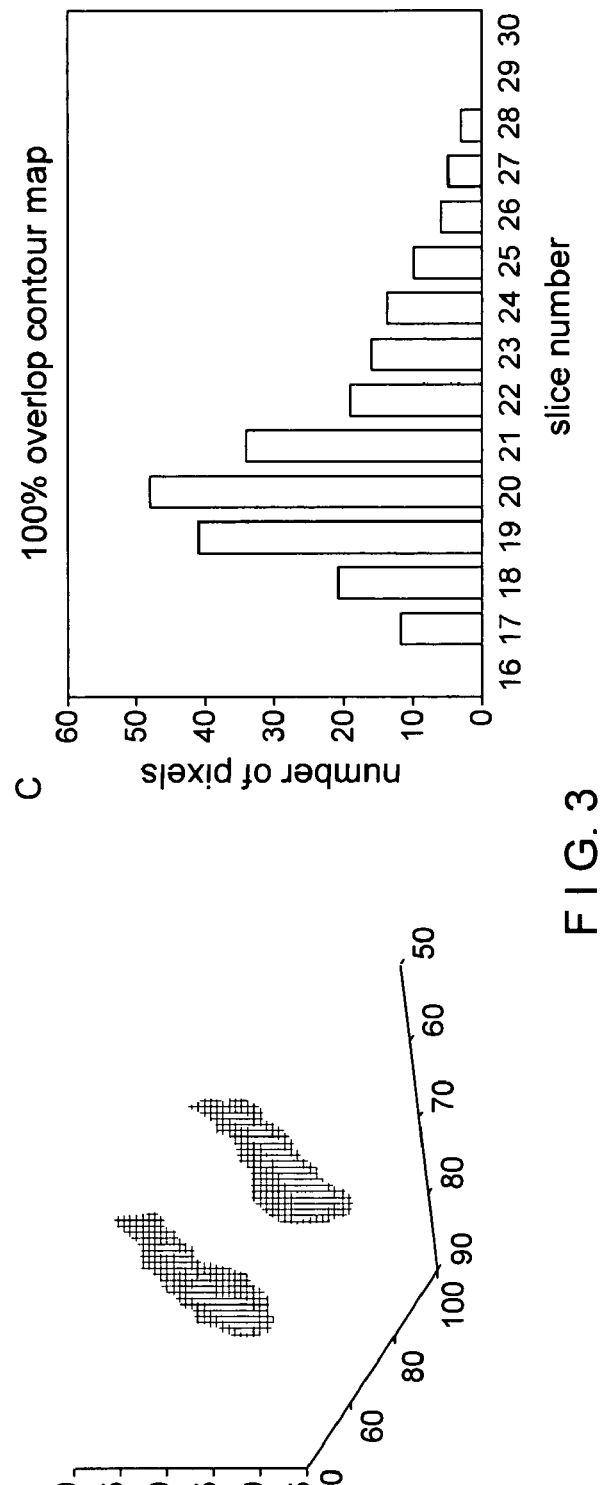

The MRI scans of the training cohort were used to create the HipMask 30 as described above. One may define the intersection of the nROIs 50 across all 48 cases (100% overlapping voxels). The intersection region covered 11 slices out of 90, beginning at slice 17 and ending at slice 28, for a volume of 0.773 cc (229 voxels), i.e. 14% of the mean hippocampus volume (5.538±0.892 cc). On visual inspection, the intersection region included the larger pes-hippocampus, and limited parts of the anterior hippocampus body and subiculum (FIGS. 3a and 3b). Anatomically, the intersection region was best represented by the pes-hippocampus. This corresponded to slices 17-22, for a total of 175/229 voxels (76.4%) (see FIG. 3c).

Slice by slice, there was a significant correlation (r=0.73, P<0.05) between the number of overlapping pixels and the size of the hippocampus (measured as the total number of pixels in the nROI 50).

Based on this anatomical evidence, the test further assessed the normalization accuracy specifically for the pes-hippocampus MIDAS was used to restrict the hippocampus ROIs 20 to the pes-hippocampus. The pes-hippocampus ROIs 20 were converted into Analyze format and spatially normalized onto the NYU-MR template 40 as described above. The nROIs were transferred back to MIDAS and a new contour map was made for the pes-hippocampus across the 48 subjects.

Again, masks were developed for the pes-hippocampus. The masks were defined as that hippocampal anatomy shared by a given percentage of the 48 cases (i.e. 100%, 99%, 98%, etc). All the different percentage-of-overlap regions exceeding the cut-off value of 80% included more than 50 voxels. As expected, results from the bootstrap analyses showed that the frequency of the 100% overlapping voxels did not follow a normal distribution. Normal distributions were found only for the number of voxels within the 94% (Shapiro-Wilk's statistics, S-W=0.027, P=0.085), 92% (S-W=0.021, P=0.2), 89% (S-W=0.022, P=0.2) and 86% (S-W=0.028, P=0.06) overlapping regions. Results from Levene's tests showed that the variances of the four distributions were comparable.

The 94% overlap region had the highest PLR (24) as compared to the others (92%: PLR=13.7, 89%: PLR=9.71, 86%: PLR=8.06). A binary masking image was thus created highlighting all the voxels in the 94% overlap region to sample hippocampus MRglc. This mask is referred to as the "HipMask" 30.

The HipMask 30 covered 5 slices out of 90, beginning at slice 17 and ending at slice 22. The Talairach coordinates of the centroids are x=27, y=−12, z=−17 for the right and x=−28, y=−12, z=−17 for the left pes-hippocampus.

The HipMask 30 had a volume of 0.439 cc (130 voxels), i.e. 37% of the pes-hippocampus template volume. This corresponded to 33% of the pes-hippocampus volume in the NL, 39% in MCI and 40% in the AD group. To examine the anatomical precision of the HipMask on a case-by case basis, for all subjects the test superimposed the HipMask on the individual pes hippocampus nROIs and determined the overlap between the HipMask and the nROIs. On average across subjects, 96±6% of the content of the HipMask was true hippocampal tissue (range: 82-100%, median value: 98%). Conversely, only 4±6% of the HipMask sampling is extra-hippocampal tissue (range: 0-18%, median value: 1.6%). As expected, the overlap was lower for the AD group (89±7%, range 82-99%, median 89%, p<0.001) as compared to both the NL (98±2%, range 93-100%, median 99%) and the MCI group (97±5%, range 82-100%, median 99%) (F[2,46]= 17.59, p<0.001). In other words, as assessed on the MRI scans 10, for the most atrophic AD case, still 82% of the HipMask 30 sampling was true hippocampal tissue.

3. Application of the First Exemplary Embodiment to Non-MR Scans

Figure 1B:
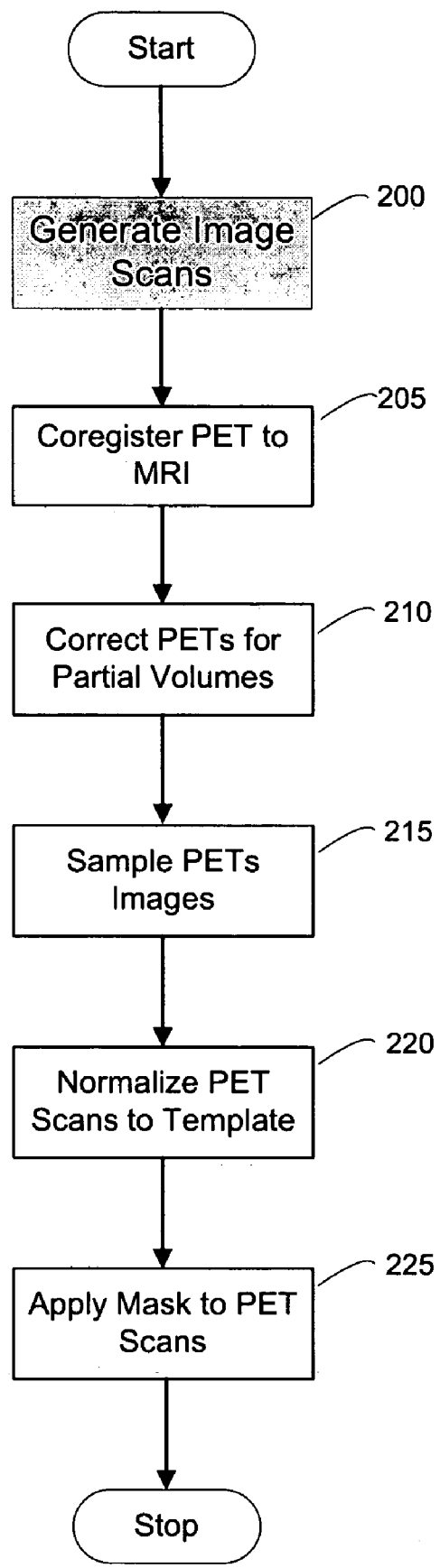
FIG. 1b is an exemplary method for applying the mask to a PET scan in accordance with the present invention.

After validating the anatomical accuracy of the HipMask 30 on MRI, the HipMask can be applied to PET scans 60. FIG. 1b depicts a flowchart of an exemplary embodiment of the method of the present invention for matching the HipMask to a PET scan. FIG. 10 depicts an illustration which provides the relationship between MRIs 10, PET 60 and the HipMask 30.

In operation 200 of FIG. 1b, a set of PET scans 60 and a set of MR scans 10 are generated from a group of patients. Table 1, below, sets forth a testing cohort used in one implementation of this application. The testing cohort may be used to verify accuracy of the HipMask 30 sampling of the hippocampus.

The acquisition of the MRIs 10 is generally known to those skilled in the art, and discussed above in more detail with respect to operation 100. Additionally, a set of PET scans 60 should be created in operation 200. In one exemplary implementation of the present invention, subjects received a PET scan 60 at BNL using a Siemens CTI-931 scanner (Knoxville, Tenn.) and 2-[$^{18}$F]fluoro-2-Deoxy-D-glucose (FDG) as the tracer within 3 months of the MR scan. The scanner generated 15 axial topographic slices covering 101 mm with an in-plane resolution of 6.2 mm full width at half maximum, and a cross slice resolution of 6.7 mm. The inter-slice distance was 6.75 mm. Images were reconstructed with the Hanning filter with a frequency cutoff of 0.5 cycles/pixel yielding 128×128 matrix with a pixel size of 1.56 mm. Each subject's head was positioned using two orthogonal laser beams and imaged with the scanner tilted 25° negative to the canthomeatal plane. This plane runs approximately parallel to the long axis of the hippocampus. To reduce head movement during scanning, a molded plastic head holder was custom-made for each subject. Attenuation correction was obtained using transmission scans.

A predetermined period of time (e.g., one hour) prior to the FDG-PET scan, a radial artery catheter and contralateral antecubital venous lines may be positioned in one exemplary implementation of the method of FIG. 1b. Further, in this exemplary implementation, subjects may receive 5-6 mCi of FDG intravenously while laying supine in a dimly lit room. Arterial blood samples may be obtained at standard intervals throughout the study to monitor glucose and $^{18}F$ levels in the blood. Scanning may commence 35 minutes after isotope injection and last for 20 minutes. The absolute glucose consumption rate may be calculated for each pixel using the Sokoloff equation with standard kinetic constants.

Figure 2:
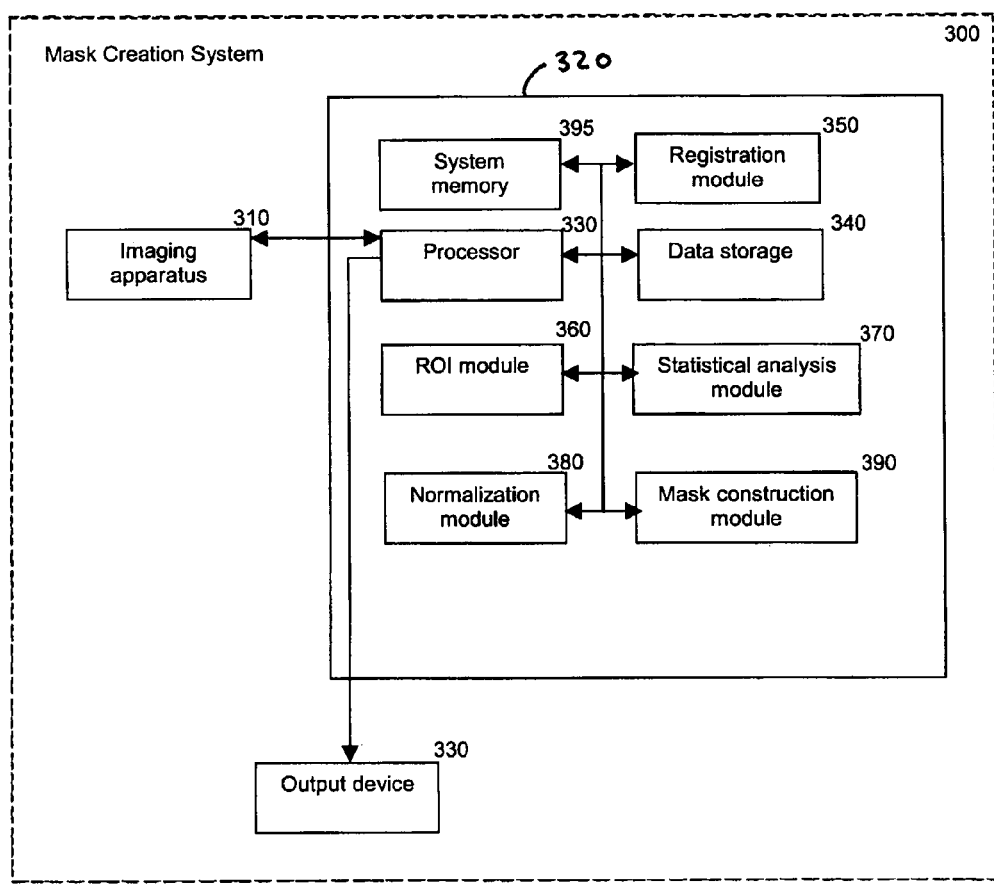
FIG. 2 is a block diagram of an exemplary embodiment of a system in accordance with the present invention which is adapted to implement the methods shown in FIGS. 1A and 1B.

Alternative exemplary embodiments may employ any known method of obtaining a PET scan 60 in conjunction with the method of FIG. 2.

Next, in operation 205, the PET scan 60 can be co-registered to the corresponding MRI 10. This may be accomplished by using a three-dimensional image acquisition method based on minimizing the variance of the signal ratios using MIDAS. According to one exemplary embodiment, a preliminary spatial alignment may be employed, using intrinsic anatomical landmarks. Brain boundary points are extracted from the PET 60 and MR scans 10 using an automatic edge finding algorithm, and the distance between the two surfaces minimized using an iterative procedure. In one exemplary test, the final version of co-registered PET/MR data consisted of eighteen 4 mm coronal sections with 230 mm FOV and 256×256 matrix.

In operation 210, the co-registered PET scans 60 can be corrected for the partial volume of cerebrospinal fluid (CSF) using any known methods. Analyses may be done both with and without atrophy correction.

In operation 215, the PET images 60 may be sampled by using the MR hippocampal ROIs 20. This may be done, for example, to validate the metabolic sampling accuracy of the HipMask relative to the gold-standard of the ROI technique. Metabolic means (μmol/100 g/min) may be computed for each ROI 20 across all slices sampled. As a reference region, the embodiment may sample the MRglc at the center of a mid pontine slice at the level of the middle cerebral peduncles with a 54×22 mm box. The pons has been shown to have preserved glucose metabolism in AD and may be used to adjust for between-subject variations in the global MRglc.

The hippocampus MRglc values may be averaged across hemispheres and normalized to the pons values.

Next, in operation 220, the PET scans 60 are spatially normalized onto the aforementioned template 40, one example of which is the NYU-MR template. As part of the spatial normalization, the PET scans 60 may be converted into an appropriate computer-readable format (such as Analyze format) and normalized with SPM'99 using the same set of linear and non-linear transformations as described above, as well as SINC interpolation.

In one exemplary verification of the exemplary embodiment of the method according to the present illustrated in FIG. 1b, both the MRI-coregistered and uncoregistered PET scans 60 were normalized to the template either using the normalization parameters derived from the MRI-coregistered scans or using PET alone. The normalized PET scans 60 were transferred back to MIDAS where the HipMask was used to extract MRglc data.

Further, in operation 225, the PET images 60 may be sampled by applying the HipMask 30 thereto. Because the PET images are co-registered to a normalized MR scan 10, the HipMask 30 can be equally applicable to the PET as to the MR scan.

FIG. 10 generally depicts an exemplary graphical display of the application of the HipMask 30 (or "HipMask," in FIG. 10) to the PET and the resulting image thereof, which is associated with the flowchart of FIG. 1a. FIG. 10 further depicts alternative analytical techniques commonly employed with PET scans 60 to determine hippocampus locations, by way of comparison.

Further, it should be understood that the operations of FIGS. 1a and 1b may be conducted with a variety of different image types beyond MRI, including (but not limited to) SPECT scans. Such operations may be be similarly applied to CT scans.

FIG. 2 depicts an exemplary system 300 for performing the exemplary methods of FIG. 1s and/or 1b. Generally, the system 300 may include an imaging apparatus 310, a computer or other processing system 320, and an output device 330. Alternative exemplary embodiments may omit one or more of these elements, such as the imaging apparatus 310 and/or output device 330, or one of the modules discussed below. Yet other exemplary embodiments may include, for example, multiple imaging apparatuses, output devices, and/or computer systems.

The imaging apparatus 310 may be, for example, an appropriately-configured MRI or PET scanning device, as described above with respect to FIGS. 1 and 2. The imaging apparatus generally scans a patient's anatomical structure (such as a brain) and creates a three-dimensional image thereof. The resulting image may be configured according to any of a number of computer-readable data schemes. The imaging apparatus 310 may, for example, execute operations 100 and/or 200.

The imaging apparatus 310 may be in communication with the computer system 320. For example, the imaging apparatus 310 may be directly connected to the computer system 320 by means of a network or communications interface (not shown), or may be indirectly connected thereto by means of an input (also not shown) operative to read the aforementioned image data from a computer-readable medium such as a compact disk, floppy disk, tape drive, or other magnetic, optical, or magneto-optical medium.

The imaging data may be received by the computer and routed to a processor 330 or data storage 340. The processor generally controls operation of the computer system 320 and its various components and modules. The processor 330 may, for example, instruct the data storage 340 to store the image data received from the imaging apparatus 310, sequence or facilitate operations of the registration module 350, ROI module 360, statistical analysis module 370, normalization module 380, and/or mask construction module 390. The operation of each module will be discussed in turn below.

The computer system 320 typically also includes a system memory 395 in communication with at least the processor 330, and often one or more modules 350, 360, 370, 380, 390 and/or the data storage 340. The system memory may store data therein that is provided by the processor or any module, and may permit access thereto as required.

The computer system 320 typically includes an ROI module 360. The ROI module 360 facilitates the various operations interacting with the creation and construction of an ROI, such as operations 105, 125, 135, and/or 215. Generally, the ROI module permits a user to define, extract, and/or superimpose various regions of interest within the image.

The normalization module 380 typically permits normalization of images and/or ROIs, such as those carried out in operations 110, 120, and or 220. Superimposition of normalized ROIs (such as in operation 130) may also optionally be executed by this module, or may instead be executed by the ROI module 360.

Statistical analysis of data, such as the aforementioned images or any ROIs, may be performed by the statistical analysis module 370. This module can generally perform the bootstrapping operation, sensitivity/specificity determination 140, and any other statistical analyses necessary (such as those in operation 135).

Finally, the mask construction module 390 is capable of creating the HipMask. This module generally interacts with the statistical analysis module 370 to receive analysis data, as well as optionally with the ROI module 310 to receive ROI data, and also optionally with the data storage 340 as required. The mask construction module 390 ultimately creates the mask from the various data provided, results of operations carried out by other modules, and user inputs. Effectively, the mask construction module 390 executes 145, and may execute operation 225.

The data storage 340 may accept and store data from the processor 330, system memory 395, and/or any module discussed herein. Data may be stored in any format, and on any device, known to those of ordinary skill in the art.

The various modules 340, 350, 360, 370, 380, 390 discussed herein are typically implemented as software, but may in further exemplary embodiments be implemented through hardware or firmware. Further, certain modules may be combined together or broken into various sub-modules. Each module is typically executed by the processor as necessary. It should be understood that the breakdown of such software or hardware by module is conceptually illustrative, rather than limiting. Thus, alternative embodiments may execute the various operations in a manner different than that set forth herein.

Further, the system 300 may include an output device 330 for display of the HipMask or any data generated by any of the modules or the imaging apparatus 310. The output device may be a computer monitor (including a CRT or LCD display), computer printer, etc.

4. Testing and Analysis of the First Exemplary Embodiment

Tests have been implemented to determine the reliability of the HipMask 30 as compared to the ROI technique, as well as how mis-positioning of the HipMask affects MRglc measurements. In such tests, each coordinate that defined the HipMask 30 was subject to a systematic perturbation of 2, 4, 6, 8, 10, and 12 mm. For each of the 36 study subjects in the test, across all perturbations, the hippocampus MRglc was tested for reliability against the ROI 20 measurements using the Intra-Class Correlation Coefficient ("ICC"). For all analyses results were considered significant for values $\geq 0.70$.

A general discussion of the results of the application of the HipMask 30 to the PET scans 60, versus the standardized implementation of ROIs 20 in the PET scans, may now be given. First, for each clinical group, the test assessed the correlations between the values extracted using the ROIs 20 from the co-registered MR-PET method and the values extracted using the HipMask 30 from the spatially normalized PET scans 60. Second, MRglc values derived from the ROIs were compared to those extracted from the HipMask with paired t-test.

Thereafter, univariate General Linear Model ("GLM") and follow-up Scheffe' tests, controlling for age, gender and pons metabolism as confounds, were used to identify the significant hippocampus MRglc effects across the 3 clinical groups for both the ROIs 20 and HipMask techniques 30.

Results were considered significant at P<0.05. All analyses were performed using SPSS 12.0 (SPSS Inc., Chicago, Ill. 2004).

Further, after normalization, PET scans 60 were smoothed with an isotropic Gaussian filter (FWHM=12 mm) using SPM'99.

NL, MCI and AD groups were compared according to the GLM with univariate statistics correcting for age, gender and pons metabolism using SPM'99. Post-hoc t-tests were performed to assess differences across groups. Results were considered significant at P<0.05, corrected for multiple comparisons.

Brain areas reaching the significance threshold were identified in terms of voxels coordinates and labeled according to the Talairach and Tournoux space, after coordinate conversion from the MNI to the Talairach space using linear transformations (see http://www.mrc-cbu.cam.ac.uk/Imaging/). MRglc values were extracted from the brain regions showing significant group effects using MarsBar toolbox and compared to the ROI 20 and HipMask 30 measures in terms of diagnostic accuracy.

All significant regions from the above analyses were examined with logistic regressions to assess the diagnostic accuracy in classifying the NL, MCI and AD groups. Analyses were performed with SPSS 12.0. Results were considered significant at P<0.05.

ANOVAs showed no differences between groups for age, gender and education. Group differences were observed for the MMSE scores, which were lower for the AD group as compared to both the NL and MCI groups (see Table 1). The MMSE scores for the MCI and NL groups were not significantly different.

The HipMask 30 showed excellent reliability when tested against the ROI technique 20 (ICC=0.886). HipMask displacements of 4 mm along the x axis (right to left) and z axis (bottom to top), and of 8 mm in all other directions led to the unreliable samplings as compared to the ROI data.

Figure 4A:
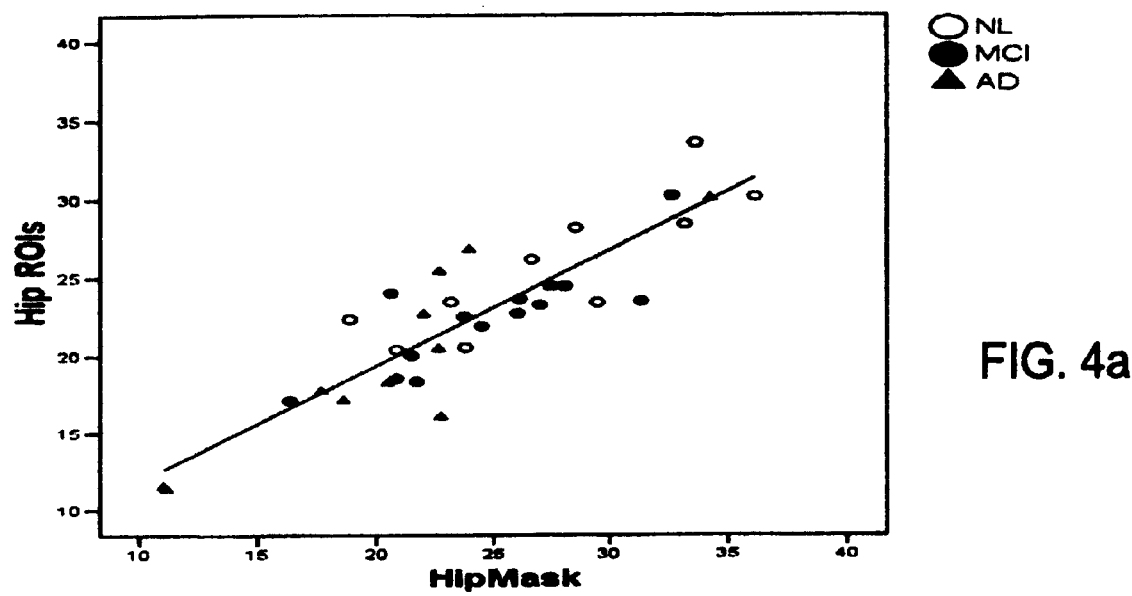
FIGS. 4a-4c are illustrations of graphs and images providing correlations between analyses carried out using the mask, and analyses carried out using a conventional ROI model.

For the whole sample (N=36), the correlation between MRglc extracted from the hippocampus ROI 20 and the HipMask 30 was r=0.89 (P<0.001) (see FIG. 4a). For the NL group the correlation was r=0.91, for the MCI the correlation was r=0.88 and for the AD was r=0.87 (P<0.001).

On paired t-test, no difference was found between hippocampus ROI and HipMask MRglc values ($t_{41}$=1.59, P=0.12, n.s.). See Table 1 for unadjusted means and SD. A strong relationship was found between the HipMask 30 MRglc measures obtained by spatially normalizing either the PET scans 60 alone or the PET co-registered with the MRI 10 (r=0.92, p<0.001). Accordingly, the HipMask 30 can be used to sample PET scans 60 without an MRI 10.

Figure 4B:
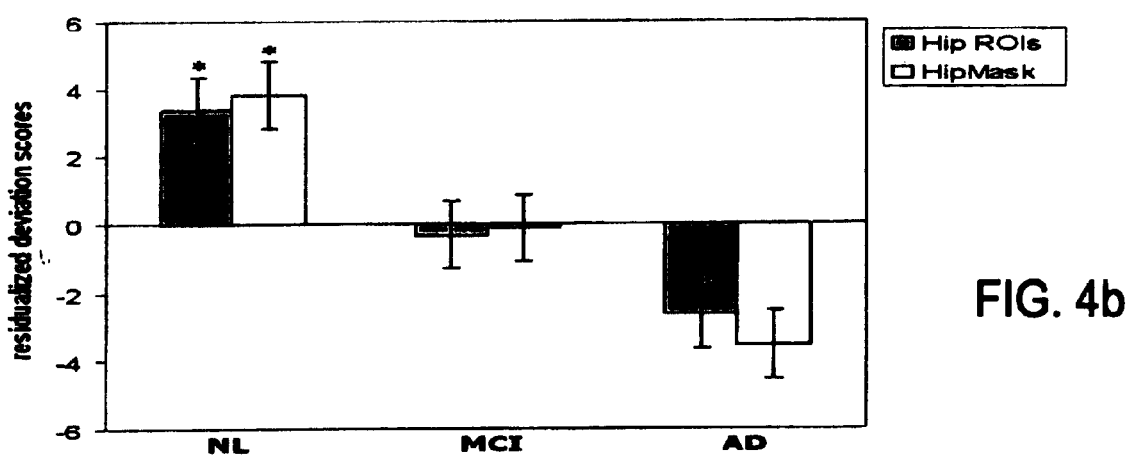

On ANCOVA, Hippocampus ROI MRglc was different across the three groups (F[2,33]=8.04, p<0.001). Post-hoc Scheffe' tests for the paired groups showed MRglc reductions for AD (31%, p<0.001) and MCI (14%, p<0.05) relative to NL. Consistent with the ROI MRglc data, the HipMask MRglc was also different across the 3 clinical groups (F[2, 33]=9.59, p<0.001). Post-hoc Scheffe' tests for the paired groups showed HipMask MRglc reductions relative to NL that were nearly identical to those found with the ROI: AD (33%, p<0.001) and MCI (10%, p<0.05) (FIG. 4b, Table 1). For neither ROI 20 nor HipMask 30 methods, were differences found between MCI and AD.

After atrophy correction, it was found increased hippocampus MRglc values for all clinical groups (range 2-27%). However, the test still found hypometabolism in MCI (13%, p<0.02) and AD (28%, p<0.001) relative to NL (Table 1). It was also observed that the HipMask 30 was associated with both the atrophy corrected (r=0.91, p<0.001) and the nonatrophy corrected (r=0.89, p<0.001) hippocampal ROI data. These data show that the mask was not subject to disproportionate partial volume errors.

Figure 4C:
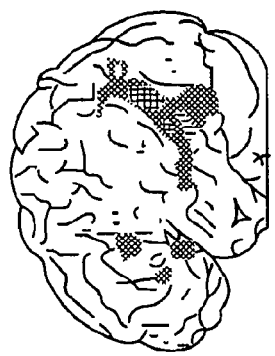
Figure 4C:
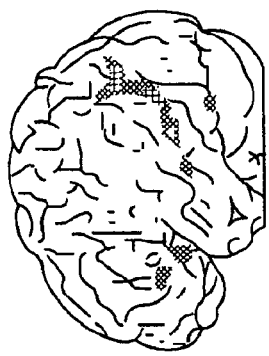
Figure 4C:
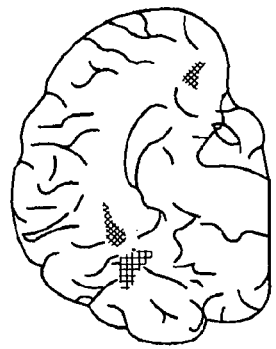
Figure 4C:
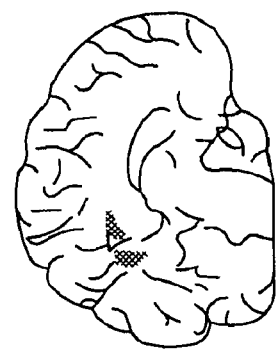
Figure 4C:
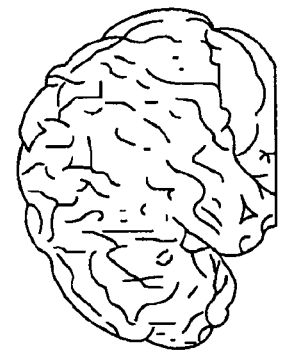
Figure 4C:
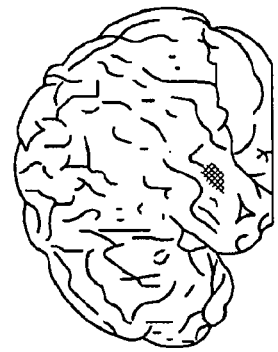
Figure 4C:
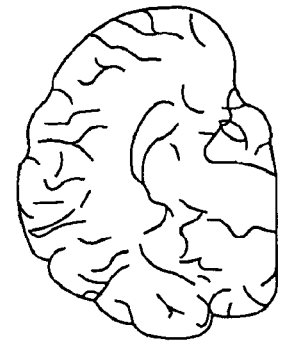
Figure 4C:
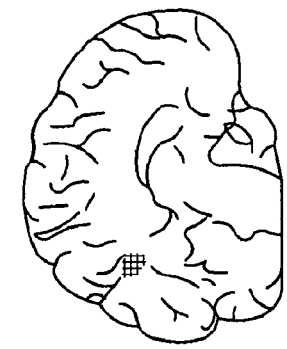

In whole-brain voxel-based analysis, significant group differences were found with SPM'99 analysis after controlling for age, gender and pons metabolism (Table 2). AD patients showed reduced MRglc within the bilateral posterior cingulate (PCC), inferior parietal (IPC), temporal (TC) and left inferior frontal cortex (IFC) as compared to the NL as well as to the MCI (P<0.05, corrected for multiple comparisons) (see FIGS. 4b and 4c). No MRglc differences were found between MCI and NL. No MRglc difference was found for the hippocampus across groups. By resetting the probability threshold at P<0.001, uncorrected for multiple comparisons, two clusters of reduced MRglc were found in MCI relative to NL: the left middle TC and the left PCC (see FIG. 3, portion C).

The logistic regression analyses showed that the hippocampus ROI 20 MRglc correctly classified 77% of the NL and MCI patients ($\chi^2$ (1)=6.91, p<0.01). Likewise, HipMask 30 MRglc classified 78% of these cases ($\chi^2$ (1)=5.76, p<0.02). Based on the VBA exploratory study, the PCC MRglc reductions classified 68% of the cases ($\chi^2$ (1)=3.59, p<0.05). The TC MRglc was not significant. Entering either hippocampal ROI 20 or HipMask 30 measures at the second step of the regression model improved the PCC MRglc discrimination accuracy from 68% to 73%, yielding improved identification of the MCI patients (82% sensitivity, at the same specificity level) (ROI: $\chi^2$ (2)=6.49, p<0.04; HipMask: $\chi^2$ (2)=7.29, p<0.03). This data underlines the importance of hippocampal evaluation in the early detection of AD.

The logistic regression analyses showed that the hippocampus ROI 20 MRglc correctly classified 78% of the NL and AD patients ($\chi^2$ (1)=11.19, p<0.001). Likewise, HipMask 30 MRglc classified 78% of these cases ($\chi^2$ (1)=13.98, p<0.001). The overall discrimination accuracy for the brain regions identified with VBA was 87% for the IPC MRglc ($\chi^2$ (1)=9.78, p<0.005), 83% for the TC ($\chi^2$ (1)=14.49, p<0.001) and IFC MRglc ($\chi^2$ (1)=16.75, p<0.001), and 74% for the PCC MRglc ($\chi^2$ (1)=8.81, p<0.005). Moreover, entering either hippocampal measure at the second step of the regression model boosted the overall discrimination accuracy from 74% to 83% for the PCC ($\chi^2$ (2)=17.97, p<0.001), from 83% to 87% for the TC ($\chi^2$ (2)=18.63, p<0.001), and from 83% to 91% for the FC ($\chi^2$ (2)=23.36, p<0.001). Only the IPC did not benefit from the added hippocampal data. These data show that hippocampal evaluation is important even after disease expression.

No hippocampal MRglc differences were found between MCI and AD with either the ROI 20 or HipMask 30 techniques. The logistic regression analyses showed that the overall discrimination accuracy for the brain regions identified with VBA was 83% for the IPC MRglc ($\chi^2$ (1)=7.23, p<0.01), 78% for the TC MRglc ($\chi^2$ (1)=16.62, p<0.001), and 70% for the FC MRglc ($\chi^2$ (1)=3.975, p<0.05). Although PCC MRglc was not a sensitive group discriminator, it showed an advantage when added to the TC measures by boosting the accuracy from 78% to 91% ($\chi^2$ (2)=18.86, p<0.001). These results show that the differentiation between MCI and AD is largely determined by the involvement of neocortex.

TABLE 2

Brain areas showing significant CMRglc differences between NL, MCI and AD, after correcting for age, gender and pons metabolism.

| Ke | Functional area | BA | Coordinates# x | y | z | Z |
|---|---|---|---|---|---|---|
| | Reduced CMRglc for AD relative to NL | | | | | |
| 335 | Inferior temporal gyrus | 20 | 54 | −13 | −28 | 3.94 |
| | Middle temporal gyrus | 21 | 56 | −1 | −20 | 3.48 |
| 286 | Middle temporal gyrus | 21 | −59 | −40 | 1 | 3.85 |
| | | 22 | −63 | −39 | 4 | 3.37 |
| | Inferior parietal lobule | 40 | −58 | −58 | 32 | 3.23 |
| 255 | Middle temporal gyrus | 20 | 62 | −19 | −12 | 3.96 |
| 240 | Middle temporal gyrus | 22 | −50 | −57 | 16 | 3.74 |
| 233 | Inferior parietal lobule | 40 | 60 | −50 | 33 | 3.38 |
| 230 | Fusiform gyrus | 37 | −46 | −51 | −12 | 3.84 |
| | Middle temporal gyrus | 21 | −58 | −48 | −8 | 3.32 |
| 146 | Posterior cingulate gyrus | 31 | −4 | −57 | 24 | 3.65 |
| | | | 3 | −59 | 22 | 3.48 |
| 108 | Inferior frontal gyrus | 45 | −56 | 22 | 20 | 3.95 |
| | Reduced CMRglc for AD relative to MCI | | | | | |
| 737 | Middle temporal gyrus | 21 | 64 | −26 | −8 | 4.51 |
| | | | 65 | −29 | −4 | 4.10 |
| | | 20 | 63 | −31 | −12 | 4.25 |
| 465 | Inferior parietal lobule | 40 | −41 | −61 | 32 | 4.00 |
| | | | −44 | −65 | 33 | 3.62 |
| 243 | Posterior cingulate gyrus | 31 | 4 | −51 | 32 | 3.50 |
| | | | −3 | −39 | 35 | 3.48 |
| 217 | Inferior parietal lobule | 40 | 52 | −51 | 32 | 3.57 |
| 63 | Inferior frontal gyrus | 47 | 38 | 22 | −2 | 3.58 |

Coordinates from the atlas of Talairach and Tournoux. x is distance in mm to the right (+) or left (−) of midline; y is the distance anterior (+) or posterior (−) to the anterior commissure, and z is the distance superior (+) or inferior (−) to a horizontal plane through the anterior and posterior commissures. Ke = cluster extent, BA = Brodmann Area.
*Z value at P < 0.05, corrected for multiple comparisons.

TABLE 3

Diagnostic classification accuracy.

| | NL and MCI | | | NL and AD | | | MCI and AD | | |
|---|---|---|---|---|---|---|---|---|---|
| | % Acc | % Sens | % Spec | % Acc | % Sens | % Spec | % Acc | % Sens | % Spec |
| Hippocampus ROI | 77 | 80 | 73 | 78 | 82 | 75 | | | |
| HipMask | 78 | 84 | 68 | 78 | 73 | 83 | | | |
| PCC | 68 | 73 | 64 | 74 | 75 | 73 | | | |
| IPC | | | | 87 | 91 | 83 | 83 | 91 | 75 |
| TC | | | | 83 | 91 | 68 | 78 | 83 | 73 |
| FC | | | | 83 | 91 | 75 | 70 | 73 | 67 |

Abbreviations: Acc, acuracy; Sens, sensitivity; Spec, specificity; PCC, posterior cingulated cortex; IPC, inferior parietal cortex; TC, temporal cortex; FC, frontal cortex.

5. Second Exemplary Embodiment

Visual Rating of Medial Temporal Lobes

A second exemplary embodiment of the method, system and storage medium according to the present invention is provide for evaluating and analyzing brain tissue shown on the PET scans 60. Similar to the first exemplary embodiment, the second exemplary embodiment may be broadly applicable to evaluation and analysis of imaged brain tissue, such as that shown in the PET scan 60.

For example, according to this embodiment, a standardized MRI scan protocol can be conducted on a set of patients to provide a set of MRIs 10. The MRI scanning procedures have been previously described above, as well as in certain references known to those of ordinary skill in the art.

For example, the MRI scans may be acquired on a 1.5 T General Electric Signa imager (General Electric, Milwaukee, USA) using a T1-weighted fast-gradient-echo sequence with repetition time=35 ms, echo time=9 ms, and flip angle 60°. Images may be reconstructed into 124 contiguous slices. MRI scans 10 may be acquired as coronal 1.3-mm-thick images obtained perpendicular to the long axis of the hippocampus (field of view (FOV)=18 cm, number of excitations=1, matrix=256×128).

After the procedure of the MRI 10, the same set of patients can typically receive a PET scan 60. One exemplary scanner suitable for use with the exemplary embodiment of the present invention can be a Siemens CTI-931 scanner (Knoxville, Tenn.) and 2-[$^{18}$F]fluoro-2-Deoxy-D-glucose (FDG) as the tracer. The scanner typically generates 15 axial topographic slices covering 101 mm along the cranio-caudal direction. The in-plane resolution may be 6.2 mm (full width at half maximum, FWHM), and the inter-slice distance may be 6.75 mm. Images may be reconstructed using a Hanning filter with a frequency cutoff of 0.5 cycles/pixel, yielding 128×128 matrix with a pixel size of 1.56 mm. Each subject's head may be positioned using two orthogonal laser beams and imaged with the scanner tilted 25° negative to the canthomeatal plane. Proc Natl Acad Sci USA 2001; 98:10966-10971 (hereinafter "de Leon"). This plane runs approximately parallel to the long axis of the hippocampus. To reduce head movement during scanning, a molded plastic head holder may be employed with any subject. Attenuation correction may be obtained using $^{68}$Ga/$^{68}$Ge transmission scans. In certain exemplary embodiments of the present invention, a particular amount of time (e.g., one hour) prior to the FDG-PET scan 60, a radial artery catheter and contralateral antecubital venous lines may be positioned. Subjects may receive 5-6 mCi of FDG intravenously while laying supine in a dimly lit room. Arterial blood samples may be obtained at standard intervals throughout the study to monitor glucose and $^{18}$F levels in the blood. Scanning typically commences 35 minutes after isotope injection and lasts for 20 minutes, although alternative embodiments may vary these times. The embodiment generally obtains and interleaves two 15-slice data acquisitions that are translated by a half-slice thickness ('3.4 mm) to improve counting statistics and reduce tissue sampling errors associated with reformatting.

Once the PET images 60 are obtained, they may be analyzed. In one exemplary embodiment, a Multimodal Image Data Analysis System package (MIDAS, version 1.6) may be used for all image analyses. Alternative embodiments may use any commercially-available, suitable imaging analysis system.

Figure 5:
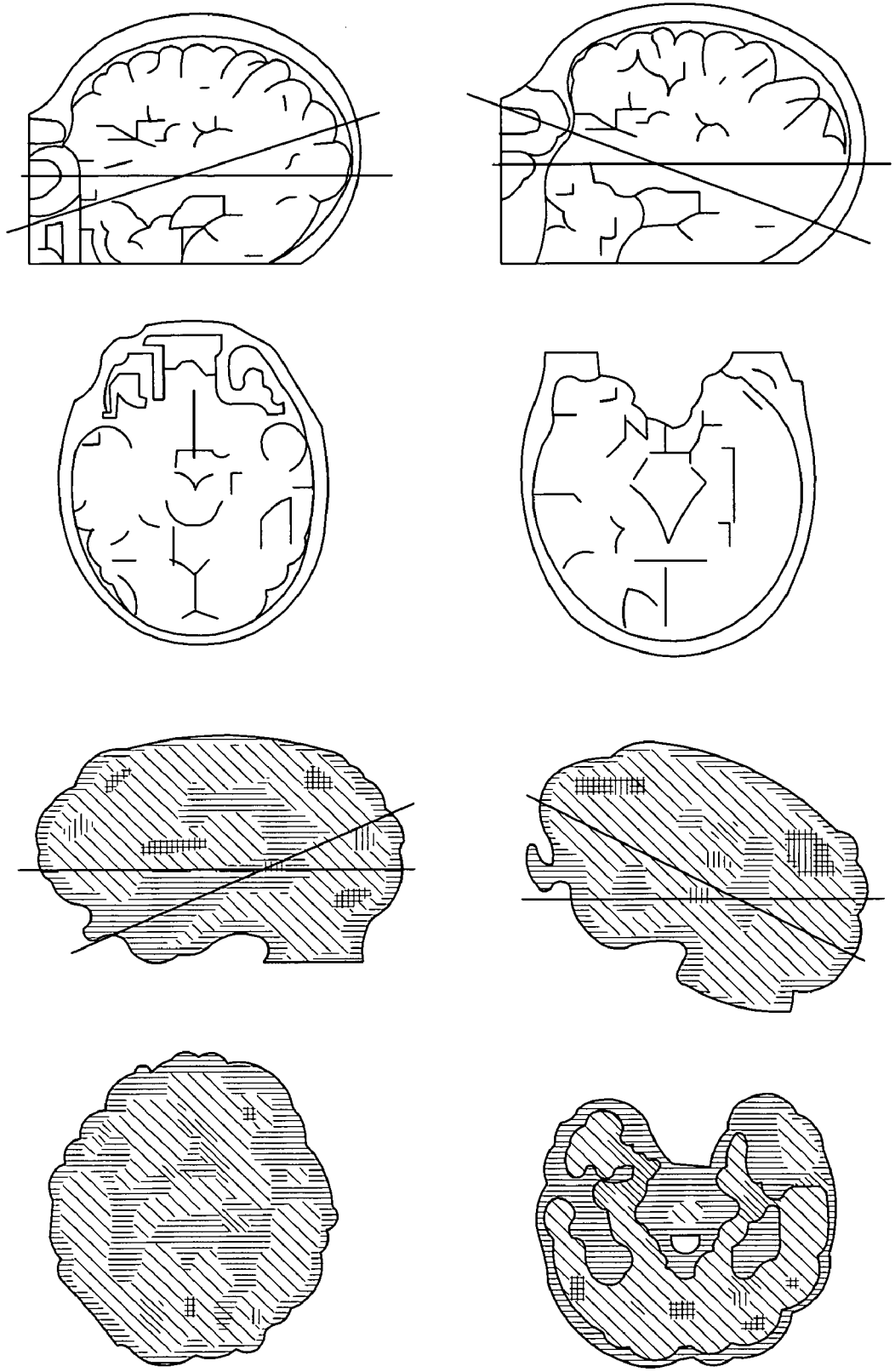
FIG. 5 is exemplary MRI-coregistered PET scans displayed in the pathological and negative angles using the exemplary embodiments of the present invention.

To standardize the images for the visual rating and to maximize visualization of the full anterior-posterior extent of the MTL, as well as to examine the MTL on a minimum number of slices, the exemplary embodiment typically selects a "negative-angle" axial plane 70 (shown in FIG. 5).

The negative-angle plane 70 extends approximately parallel to the long axis of the hippocampus, as assessed on the sagittal view and validated by the MRI 10. On the PET 60, this negative angulation can be determined with reference to the lower metabolic intensity of the white matter of the temporal lobe (see FIG. 5). The scans may be resliced to 3 mm-thick sections, which enables in all cases examination of the MTL in two or three axial slices.

In order to examine the cortical metabolism in a standard orientation used by prior studies, another axial orientation may be used, the so-called pathological angle 80 (see FIG. 5). The pathological angle runs parallel to the line that connects the basal frontal lobe to the occipital pole. This may yield 6.75 mm-thick contiguous sections from the base of the brain to the vertex, which enables examination of the cortex in several axial slices. A neuroradiologist typically orients all PET scans 60. All images were displayed using the neurological convention (i.e., left is left).

An ROI validation study may be conducted. For the ROI validation study, all PET scans 60 are co-registered with the corresponding MRI 10 by using a three-dimensional method based on minimizing the variance of the signal ratios between the two scan modalities. One embodiment calls for a preliminary spatial alignment, using intrinsic anatomical landmarks. The co-registered PET/MRI data typically consists of coronal sections perpendicular to the plane of the negative angulation with 230 mm FOV and 256×256 matrix. The absolute glucose consumption rate is calculated for each pixel using the Sokoloff equation, as known to those skilled in the art. In the quantification of metabolism a set of standard kinetic constants [k1=0.095, k2=0.125, k3=0.069, k4=0.055; and lumped constant=0.52] is used.

Figure 6:
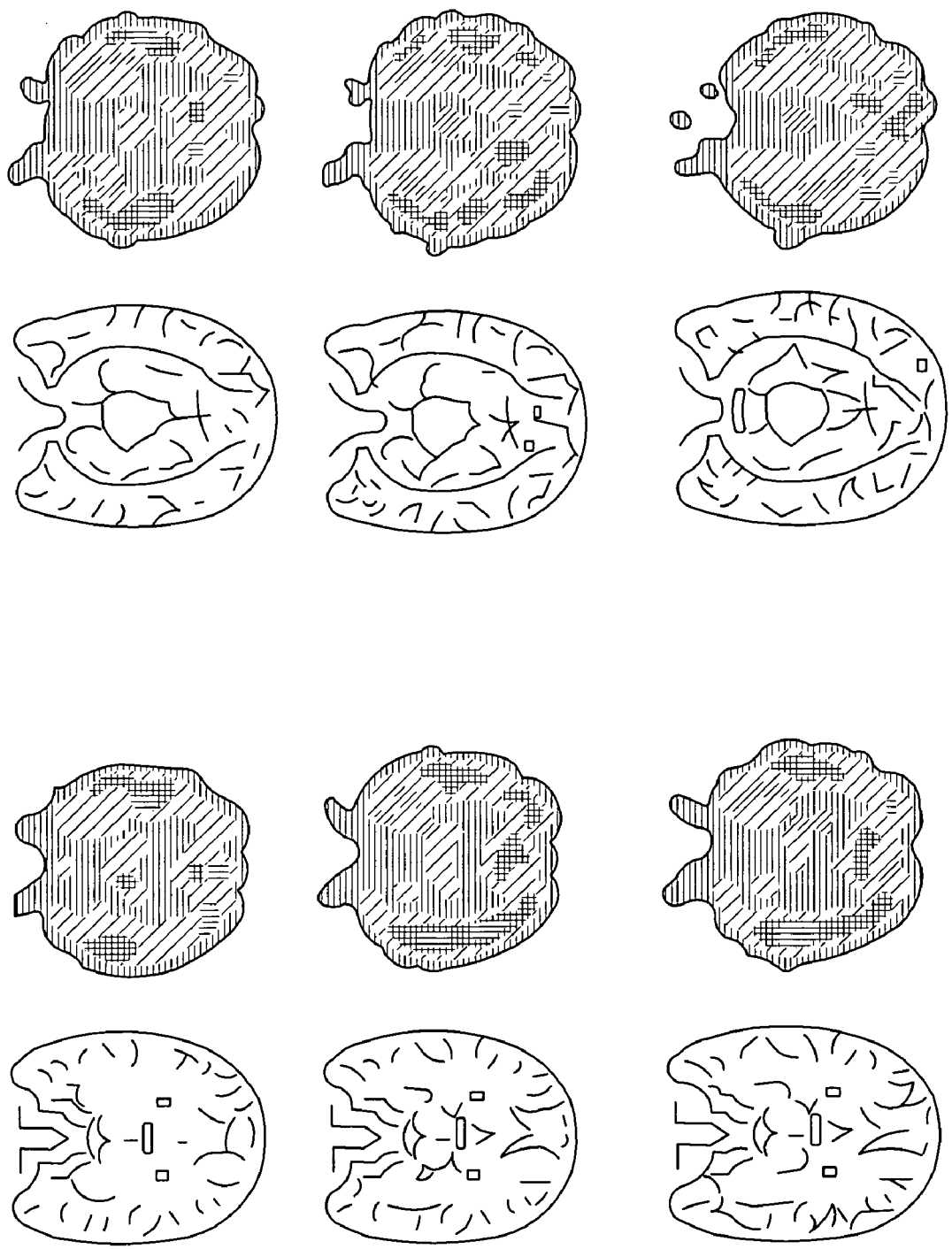
FIG. 6 is exemplary PET scans showing anatomical references that may be used in a visual rating system in accordance with the present invention.

Thus, the images may be visually rated. First, the medial temporal lobe (MTL) is discussed. The MTL includes the hippocampus, entorhinal cortex (EC), and parahippocampal gyrus (PHG). In order to standardize the assessment of the MTL on PET 60, the embodiment may select specific MRI 10 determined anatomical landmarks that are consistently visible on PET 60 (see, for example, FIG. 6). To standardize and maximize coverage of the MTL and to include the entire hippocampus across cases, the embodiment may restrict assessment to those slices showing the pontine body. As such, the axial sections evaluated are inferior to the ascending tail of the hippocampus (which corresponds to the level of the posterior pulvinar) and superior to the white matter of the PHG. A visual depiction of certain exemplary selected anatomical landmarks is provided in FIG. 6.

Current criteria for the evaluation of the PET scan 60 provides a diagnosis of possible AD if the scan is characterized by (1) focal cortical hypometabolism in parietal, temporal, or with more advance cases also including the frontal lobes, or (ii) diffuse cortical hypometabolism with relative sparing of sensorimotor and visual primary cortex, thalamus, basal ganglia, and cerebellum.

Next, the axial FDG-PET scans 60 of the testing cohort can be inspected by multiple raters. The raters may examine and rate the negative-angle slices 70, the pathological angle slices 80, or both. Raters should be blind to all clinical information of the patients except for age, since aging may produce subtle metabolic variations (see the Hoffman article). Subjects are typically anonymized and randomized in order of presentation. All scans may be separately studied using two axial protocols, one for the cortical assessment and one for the MTL assessment. The embodiment employs a subjective four-point rating scale to evaluate cortical and MTL metabolism:

0=normal metabolism
1=questionable hypometabolism
2=mild but definite (i.e. localized) hypometabolism
3=moderate to severe hypometabolism The scale is applied to the left and right hemispheres separately. To be considered indicative of regional hemispheric hypometabolism (scores 2 and 3), the observed regional abnormality should be observed in at least two contiguous slices.

Figure 7:
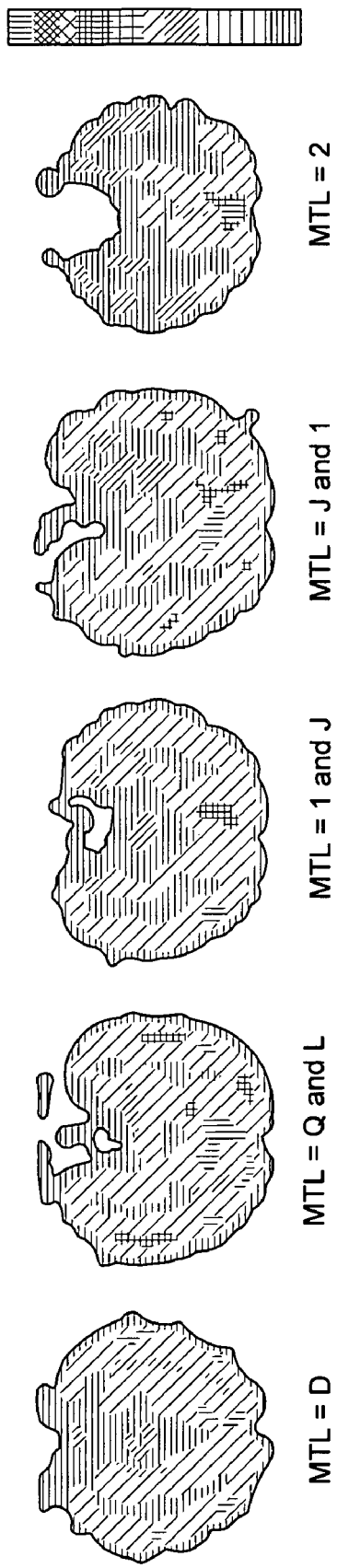
FIG. 7 is an illustration of negative-angle axial PET images, each depicting an example of a tissue structure assigned a different rating in the visual rating system.

As previous studies demonstrated that unilateral cortical hypometabolism is commonly found in AD patients (see the Hoffman article for review), normal cortical metabolism is defined by the current method as right and left ratings<2, while hypometabolism is defined as right or left ratings≧2. FIG. 7 shows a negative-angle axial PET view 70 depicting five examples of MTL ratings.

For the MTL ratings, it may be determined whether unilateral or bilateral hypometabolism would better characterize the clinical groups.

As an initial matter, the raters can examine each pathological-angulation PET scan 20 for cortical metabolism. Subsequently, the raters examine the negative-angulation scans 70 for MTL metabolism.

Statistical analysis may be employed to determine accuracy of the ratings. One-way ANOVA and Chi squared ($\chi^2$) tests may be used for group comparisons. Scheffe' tests may be used for pair-wise comparisons. ANCOVA may be used to examine the ROI MRglc measures across the 3 clinical groups, after controlling for age and pons metabolism.

In order to assess the reliability of scan reading, Intra-Class Correlations (ICC) may be computed for both the cortical and MTL scores. To assess the within-rater reliability, one rater re-evaluated all scans two and four days after the first presentation. To assess the between-raters reliability, the 4 raters' scores may be averaged for each scan, and separately for the left and right hemisphere. The dichotomized summed score (no hypometabolism [score 01] and hypometabolism [score 2-3]) may be used to classify PET scans 60 as diagnostically Negative (N) or Positive (P) for abnormal metabolism. All scans may be classified as P or N basing on cortical and MTL ratings. For testing of the unilateral hypothesis, scans may be classified as P for scores≧2 in one hemisphere. For testing of the bilateral hypothesis, scans may be P for scores≧2 in both hemispheres.

Logistic regression analyses may be performed to assess the sensitivity, specificity, and overall diagnostic accuracy of the cortical and MTL rating scales separately and in combination. This exemplary embodiment may utilize a 2-step logistic regression model to determine if the MTL scores added to the cortical scores in the classification of subjects between diagnostic groups. In the first step, the cortical scores can be entered, and in the second step, the corresponding MTL scores may be entered. By reversing the first and second steps, the contribution of cortical above MTL ratings may also be examined. An overall diagnostic accuracy may be calculated. The same logistic regression models may be used to compare the ROI measures to the MTL ratings as diagnostic tools.

The analyses can be performed by the exemplary embodiment of the present invention that uses SPSS 12.0 (SPSS Inc., Chicago, Ill. 2004). Results may be considered significant at p<0.05.

To quantitative MTL metabolism, ROIs 20 can be drawn in both hemispheres of the sample on three-fold enlarged coronal PET-co-registered MRI 10 of the testing cohort using image analysis software. Each of two observers, blind to subject diagnosis, may draw all ROIs on half of the cases (randomly chosen). Each ROI 20 may be independently checked for accuracy by the other observer and any changes made by joint agreement.

The MTL ROI 20 typically includes the hippocampus, EC and PHG. A description of the ROI method has been previously published. Briefly, these regions are sampled anteriorly from the level of the anterior-most amygdala and posteriorly to the level of the posterior pulvinar. To sample a region containing the EC, the anterior portion of the PHG is examined using boundaries derived from our post mortem validation study (see Bobinski M, de Leon M J, Convit A, et al.; MRI of entorhinal cortex in mild Alzheimer's disease. Lancet 1999; 353:38-40). The anterior boundary for the anterior PHG sample is generally 4 mm posterior to the fronto-temporal junction and the posterior boundary is the anterior margin of the lateral geniculate body. The superior boundary of the anterior PHG in both anterior and posterior sections is the dorsal and most medial aspect of the PHG. The inferior boundary is the collateral sulcus. The hippocampal ROI 20 is drawn along the full anterior-posterior extent of the hippocampus and includes a portion of the subiculum. The inferior border is the PHG. The lateral hippocampal border is the temporal horn of the lateral ventricle and the medial border is the ambient cistern. The anterior and posterior borders are the full anterior peshippocampus, and the tail of the hippocampus, which corresponds to the level of the crux of the fornix. Using this procedure, the embodiment may include most parts of the tissue inspected using the visual scale, as assessed on MRI 10.

Pons MRglc may be sampled at the center of a mid pontine slice at the level of the middle cerebral peduncles with a 16×16 mm box (see the Hippocampal formation article) and used to adjust for subject variations in the global MRglc. The ROIs may be applied to the PET images to extract MRglc (μmol/100 g/min) across all slices sampled and averaged separately for each hemisphere.

The above method has been clinically tested. The results of that clinical test will now be discussed.

The NL, MCI and AD groups in the testing cohort were comparable for age, gender, and education (Table 4). Group differences were observed for the MMSE scores (F[1,36]= 8.94, p<0.001). Post hoc comparisons between groups showed significantly lower MMSE scores for AD as compared to NL (p<0.001) (Table 4).

TABLE 4

Subjects' characteristics (Second embodiment)

|  | NL | MCI | AD |
|---|---|---|---|
| N | 14 | 13 | 12 |
| Age (yrs) | 74 (9) | 75 (7) | 76 (7) |
| range | 58-88 | 63-84 | 63-84 |
| Females | 43 | 39 | 42 |
| Education (yrs) | 15 (3) | 16 (2) | 15 (2) |
| range | 14-17 | 15-18 | 14-17 |
| MMSE | 29.7 (0.6) | 27.8 (1.9) | 23.8 (4.5)† |
| range | 28-30 | 24-30 | 16-29 |
| MTL ROI MRglc |  |  |  |
| Right | 26.13 (4.23) | 22.39 (2.77)* | 20.41 (4.86)† |
| Left | 25.91 (4.14) | 22.31 (2.85)* | 20.38 (5.11)† |

Values are means (SD).
Abbreviations. MMSE = Mini-Mental Status Examination; MRglc = metabolic rate for glucose (MRglc, tmol/100 gr/min, pons-adjusted values); MTL = medial temporal lobe; ROI = regions of interest.
*Significantly different from NL, p < .05
†Significantly different from NL, p < .001

The within-rater agreement for the cortical ratings was ICC=0.93 for the left hemisphere (95% C.I.=0.88-0.97), and for the right hemisphere ICC=0.95 (95% C.I.=0.91-0.97) (p's<0.001). The agreement between raters for the MTL was ICC=0.86 for the left hemisphere (95% C.I.=0.78-0.91) and for the right hemisphere ICC=0.86 (95% C.I.=0.79-0.93) (p's<0.001).

The between-rater agreement for the cortical ratings was ICC=0.95 for the left and right hemispheres (95% C.I.=0.91-0.97), and for the MTL ratings was ICC=0.93 for the left hemisphere (95% C.I.=0.86-0.96), and for the right hemisphere ICC=0.95 (95% C.I.=0.90-0.97) (p's<0.001).

Sensitivity and specificity of the cortical, MTL, and cortical+MTL ratings in identifying NL, MCI and AD are summarized in Table 5.

The cortical scores show a clear distinction between NL and AD, as all NL subjects scored below the cut-off for impairment while all AD patients scored in the impaired range. This resulted in an overall discrimination accuracy of 100% ($\chi^2$ (1)=35.89, p<0.0001). All AD patients had bilateral MTL reductions, so the unilateral hypothesis was not tested. MTL ratings discriminated AD and NL with 92% sensitivity and 71 specificity (81% accuracy, $\chi^2$ (1)=11.79, p<0.001). Therefore, the cortical ratings were generally superior to MTL ratings in the diagnosis of NL and AD.

The cortical ratings did not significantly distinguish MCI from NL, as minimal cortical damage was observed in MCI. Conversely, MTL ratings using bilateral hypometabolism as diagnostic cut-off discriminated MCI and NL with 77% sensitivity and 71% specificity (74% accuracy, $\chi^2$ (1)=6.59, p<0.01). MTL ratings using unilateral hypometabolism as diagnostic cut-off discriminated MCI and NL with 100% sensitivity but only 50% specificity (74% accuracy, $\chi^2$ (1)=10.88, p<0.001). Therefore, only the bilateral MTL ratings were included in the regression model. Adding the bilateral MTL ratings to the cortical ratings significantly improved the diagnostic sensitivity from 23% to 85%, with 71% specificity and 78% overall accuracy ($\chi^2$ (2)=11.30, p=0.004). This effect is shown in Table 5.

Cortical ratings discriminated AD and MCI with 100% sensitivity and 77% specificity (88% accuracy, $\chi^2$ (1)=19.61, p<0.001). Conversely, the MTL ratings did not significantly distinguish AD from MCI. This data indicates that MTL hypometabolism is as common in MCI as in AD. Nonetheless, adding MTL to cortical ratings improved the specificity from 77% to 92% and the diagnostic accuracy from 88% to 96% ($\chi^2$ (2)=57.56, p<0.0001).

After correcting for pons metabolism, ANCOVA showed differences between NL, MCI and AD groups for the MTL ROI 20 MRglc in both the left ($F_{1,38}$=9.57, p<0.001) and right hemispheres ($F_{1,38}$=13.02, p<0.001). Post-hoc comparisons between groups showed lower MTL MRglc for the MCI (14% left and 11% right, p's<0.05) and AD group (31% left and 22% right, p's<0.001) as compared to NL (Table 4). No difference was found between MCI and AD.

Figure 8:
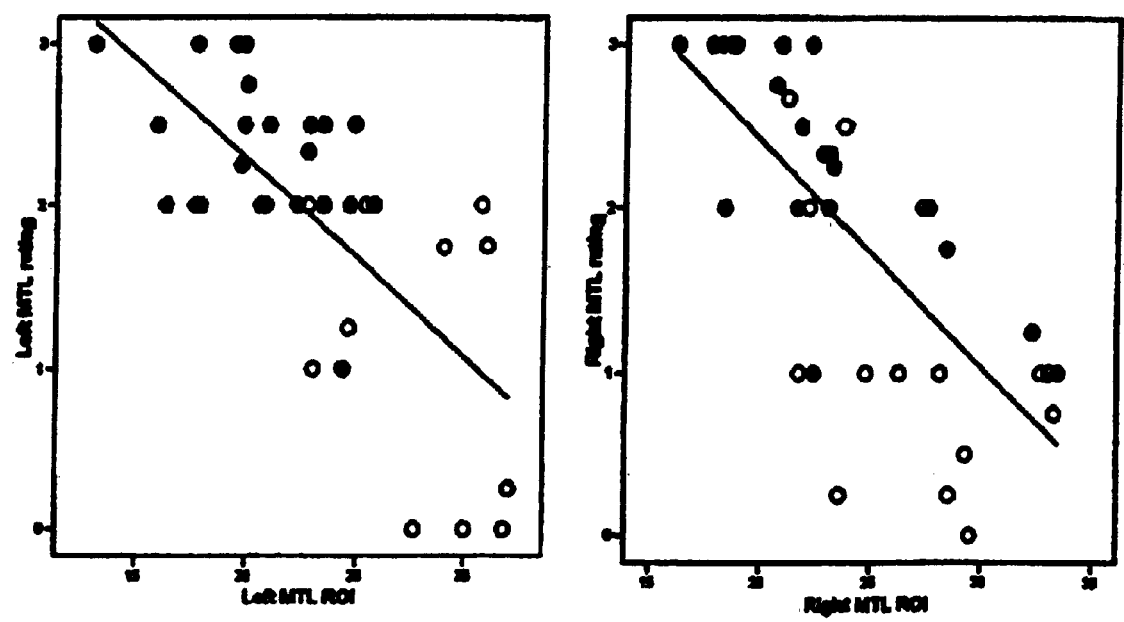
FIG. 8 is an exemplary graph providing correlations between MTL visual ratings and corresponding ROI measures.

Relatively significant correlations were found between the MTL visual ratings and ROI 20 measures in both the left (r=−0.70, p<0.001) and right hemisphere (r=0.73, p<0.001) (see FIG. 8).

As shown in Table 5, the bilaterally averaged MTL ROI MRglc data discriminated AD from NL with 75% sensitivity and 79% specificity (77% overall accuracy, $\chi^2$ (1)=13.01, p=0.001), and MCI from NL with 69% sensitivity and 64% specificity (67% overall accuracy, $\chi^2$ (1)=9.81, p=0.002). Neither the ROI data nor the MTL rating distinguished MCI from AD. When looked for the hippocampal ROI 20 specifically, the correlations with the MTL rating and the overall diagnostic accuracy (Table 5) remained substantially unchanged. Overall, these data show that the visual MTL ratings yield a diagnostic accuracy as good as those from the ROI measures 20.

TABLE 5

Diagnostic value of cortical and MTL ratings, and MTL ROI data (Second embodiment)

| | AD vs NL | | MCI vs NL | | AD vs MCI | |
|---|---|---|---|---|---|---|
| | SS | SP | SS | SP | SS | SP |
| Cortical ratings | 100 | 100 | n.s. | n.s. | 100 | 77 |
| MTL ratings | 92 | 71 | 77 | 71 | n.s. | n.s. |
| MTL ROI | 75 | 79 | 69 | 64 | n.s. | n.s. |
| Hippocampal ROI | 75 | 79 | 77 | 71 | n.s. | n.s. |
| Cortial + MTL ratings | n.a. | n.a. | 85 | 71 | 100 | 92 |

Abbreviations: MTL = medial temporal lobes, SP = specificity, SS = sensitivity. N.a. = not assessed; n.s. = not significant.

6. Conclusion

The various exemplary embodiments disclosed herein are generally computer-implemented, but may to some extent be manually performed. The second embodiment, for example, generally requires user input in the form of visual classification and an indication of that classification. However, alternative embodiments may be configured to be completely automated, requiring no user intervention or input. Such embodiments may be executed on any sufficiently powerful computing device, and may take the form of software or other computer-readable instructions, computer hardware (such as logic boards, application-specific integrated circuits, and so forth), or a combination of the two.

While the present invention has been set forth in terms of specific embodiments thereof, the instant disclosure is such that numerous variations upon the invention are now enabled to those skilled in the art, which variations yet reside within the scope of the present teaching. Accordingly, the present invention is to be construed by broadly interpreting the scope and spirit of the present disclosure.

What is claimed is:

1. A method for at least one of creating or modifying an anatomical structure mask, comprising:
   obtaining a first region of interest from at least one first image associated with at least one first subject;
   obtaining a second region of interest from at least one second image associated with at least one second subject;
   selectively analyzing each of the first and second regions of interest using an iterative procedure;
   determining a percentage of an overlap region that is common to the first and second regions of interest based on a predetermined criteria;
   determining a particular ratio of sensitivity to specificity for each of the first and second regions of interest; and
   using a computing arrangement, at least one of creating or modifying the anatomical structure mask based on the percentage of the overlap region, and modifying the anatomical structure mask to account for the particular ratio of sensitivity to specificity;
   wherein for the particular ratio of sensitivity to specificity, the sensitivity is defined as a volume of an anatomical structure correctly included in a sampling region divided by a total anatomical structure volume, and the specificity is defined as a volume of a non-anatomical structure correctly excluded from the mask divided by a total non-anatomical structure volume.

2. The method of claim 1, further comprising:
selecting a particular set of scanned images;
generating the first and second images associated with the first and second subjects, each of the first and second images corresponding to a unique one of the particular set of scanned images.

3. The method of claim 1, wherein at least one of the first or second images comprises an image of a brain.

4. The method of claim 3, wherein each of the first and second regions of interest includes a hippocampus.

5. The method of claim 3, wherein each of the first and second regions of interest includes an amygdala.

6. The method of claim 1, further comprising:
generating a template from each of the first and second images; wherein the operation of obtaining each of the first and second regions of interest based on the first and second images comprises:
registering each of the first and second images to the template to create a set of registered images; and
extracting the first and second regions of interest from each of the registered images.

7. The method of claim 1, wherein the anatomical structure mask comprises a mask of a particular anatomical structure.

8. The method of claim 7, wherein the mask of the particular anatomical structure is derived from the first and second images.

9. The method of claim 1, wherein the first and second images are magnetic resonance images.

10. The method of claim 1, wherein the first and second images are positron-emission tomography images.

11. The method of claim 1, further comprising:
obtaining a third image associated with at least one third subject;
registering the third image to a template image comprising the first and second images; and
at least one of creating or modifying the anatomical structure mask for the third image from the anatomical structure mask associated with the first and second subjects.

12. The method of claim 11, further comprising using the template image to normalize the third image.

13. The method of claim 12, wherein the first and second images are a first image type, and the third image is a second image type.

14. The method of claim 13, wherein the first image type is a magnetic resonance image, and the second image type is a positron-emission topography scan.

15. A system for at least one of creating or modifying an anatomical structure mask, comprising:
a processing arrangement which, when executing a software program embodied on a computer-readable medium encoded with computer executable instructions, is configured to:
obtain a first region of interest from at least one first image associated with at least one first subject;
obtain a second region of interest from at least one second image associated with at least one second subject;
selectively analyze each of the first and second regions of interest using an iterative procedure;
determine a percentage of an overlap region that is common to the first and second regions of interest based on a predetermined criteria;
determine a particular ratio of sensitivity to specificity for each of the first and second regions of interest; and
at least one of creating or modifying the anatomical structure mask based on the percentage of the overlap region, and modifying the anatomical structure mask to account for the particular ratio of sensitivity to specificity;
wherein for the particular ratio of sensitivity to specificity, the sensitivity is defined as a volume of an anatomical structure correctly included in a sampling region divided by a total anatomical structure volume, and the specificity is defined as a volume of a non-anatomical structure correctly excluded from the mask divided by a total non-anatomical structure volume.

16. A non-transitory computer-readable medium comprising computer readable instructions which is provided for at least one of creating or modifying an anatomical structure mask, wherein, when a processing arrangement executes the instructions, the processing arrangement is configured to:
obtain a first region of interest from at least one first image associated with at least one first subject;
obtain a second region of interest from at least one second image associated with at least one second subject;
selectively analyze each of the first and second regions of interest using an iterative procedure;
determine a percentage of an overlap region that is common to the first and second regions of interest based on a predetermined criteria;
determine a particular ratio of sensitivity to specificity for each of the first and second regions of interest; and
at least one of creating or modifying the anatomical structure mask based on the percentage of the overlap region, and modifying the anatomical structure mask to account for the particular ratio of sensitivity to specificity;
wherein for the particular ratio of sensitivity to specificity, the sensitivity is defined as a volume of an anatomical structure correctly included in a sampling region divided by a total anatomical structure volume, and the specificity is defined as a volume of a non-anatomical structure correctly excluded from the mask divided by a total non-anatomical structure volume.

17. A computer system, comprising:
computer-accessible data associated with a percentage of an overlap region that is common to a first region of interest obtained from at least a first image associated with at least one first subject, and a second region of interest obtained from at least a second image associated with at least one second subject, based on a predetermined criteria,
wherein the computer-accessible data is associated with a particular ratio of sensitivity determined to specificity for the first and second regions of interest, and the sensitivity is defined as a volume of an anatomical structure correctly included in a sampling region divided by a total anatomical structure volume, and the specificity is defined as a volume of a non-anatomical structure correctly excluded from the mask divided by a total non-anatomical structure volume.

18. The computer system of claim 17, wherein the percentage of the overlap region is derived from the first and second images by:
selectively analyzing the first and second images using an iterative procedure.

19. The method of claim 1, wherein the determining step further comprises establishing a probabilistic map of at least one of the first and second regions of interest.

20. The method of claim 1, further comprising normalizing the first and second images associated with the first and second subjects to produce normalized images before the obtaining steps.

21. The method of claim 1, further comprising analyzing each of the first and second regions of interest to provide analysis data.

22. The method of claim 1, wherein the predetermined criteria is at least one of: (1) the percentage of the overlap region exceeds a predetermined percentage; (2) a dimension of an intersection region between the first and second regions of interest exceeds a predetermined amount; (3) a frequency of a number of voxels within the overlap region follows a particular distribution; and (4) a particular positive likelihood ratio.

23. The method of claim 22, wherein the predetermined percentage is about 80%.

24. The method of claim 22, wherein the predetermined amount is an amount relating to scanner resolution.

25. The method of claim 24, wherein the predetermined amount is about 2 times a full-width at half-maximum of a scanner used to obtain an image of the first or second subject.

26. The method of claim 1, further comprising applying a bootstrapping procedure to the percentage of the overlap region.

27. The method of claim 26, wherein the bootstrapping procedure is performed with replacement.

28. The method of claim 26, wherein the bootstrapping procedure is followed by a Shapiro-Wilk test to test a normality of a distribution of voxel frequency at different levels for the percentage of overlap.

29. The method of claim 1, further comprising utilizing a procedure to analyze variances between data associated with the percentage of the overlap region.

30. The method of claim 29, wherein a Levene's test procedure for equal variances is utilized to identify a distribution with a smallest variance between the data.

31. The method of claim 1, further comprising:
obtaining a third region of interest from at least one third image associated with at least one third subject; and
determining the percentage of the overlap region that is common to the first, second and third regions of interest based on the predetermined criteria.

32. The method of claim 1, wherein at least one of the first or second regions of interest is manually determined.

33. The method of claim 1, further comprising determining a third region of interest by locating corresponding points from the percentage of the overlap region to an image for at least one of the first subject, the second subject or a third subject.

34. The method of claim 1, further comprising aligning the first and second images before the determining step.

35. The method of claim 1, wherein the first and second images are two-dimensional images.

36. The method of claim 1, wherein the first and second images are three-dimensional images.

37. The method of claim 1, wherein the anatomical structure is a hippocampus.

38. The computer system of claim 17, wherein the predetermined criteria is at least one of: (1) the percentage of the overlap region exceeds a predetermined percentage; (2) a dimension of an intersection region between the first and second regions of interest exceeds a predetermined amount; (3) a frequency of a number of voxels within the overlap region follows a particular distribution; and (4) a particular positive likelihood ratio.

39. The computer system of claim 38, wherein the predetermined percentage is about 80%.

40. The computer system of claim 38, wherein the predetermined amount is an amount relating to scanner resolution.

41. The computer system of claim 40, wherein the predetermined amount is about 2 times a full-width at half-maximum of a scanner used to obtain an image of the first or second subject.

42. The computer system of claim 17, wherein the anatomical structure is a hippocampus.

* * * * *